(12) United States Patent
Yasuo et al.

(10) Patent No.: US 6,329,094 B1
(45) Date of Patent: Dec. 11, 2001

(54) POLYMER ELECTROLYTE FUEL CELL SHOWING STABLE AND OUTSTANDING ELECTRIC-POWER GENERATING CHARACTERISTICS

(75) Inventors: Takashi Yasuo; Toru Nakaoka; Akira Hamada; Yasuo Miyake; Yasunori Yoshimoto; Mitsuo Karakane, all of Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/423,168

(22) PCT Filed: Apr. 5, 1998

(86) PCT No.: PCT/JP98/01707

§ 371 Date: Nov. 3, 1999

§ 102(e) Date: Nov. 3, 1999

(87) PCT Pub. No.: WO98/52242

PCT Pub. Date: Nov. 19, 1998

(30) Foreign Application Priority Data

May 14, 1997 (JP) .................................................. 9-124221
Jul. 14, 1997 (JP) .................................................. 9-188572
Sep. 22, 1997 (JP) .................................................. 9-257330

(51) Int. Cl.$^7$ ............................................................ H01M 2/00
(52) U.S. Cl. ........................... 429/34; 429/12; 429/13; 429/17; 429/30
(58) Field of Search ............................. 429/12, 13, 17, 429/30, 34

(56) References Cited

U.S. PATENT DOCUMENTS 6,042,955 * 3/2000 Okamoto .................................. 429/13
6,083,638 * 7/2000 Taniguchi et al. ...................... 429/34
6,180,274 * 1/2001 Yoshimoto et al. .................... 429/34

FOREIGN PATENT DOCUMENTS

| 56-97972 | 8/1981 | (JP) . |
|---|---|---|
| 59-37663 | 3/1984 | (JP) . |
| 62-97265 | 5/1987 | (JP) . |
| 4-264365 | 9/1992 | (JP) . |
| 05041230 A | 2/1993 | (JP) . |
| 6-188008 | 7/1994 | (JP) . |
| 7-220746 | 8/1995 | (JP) . |
| 8-138691 | 5/1996 | (JP) . |
| 8-138692 | 5/1996 | (JP) . |
| 8-321317 | 12/1996 | (JP) . |
| 09139222 A | 5/1997 | (JP) . |

OTHER PUBLICATIONS

PCT/JP98/01707 International Search Report, Completed: Aug. 10, 1998.

* cited by examiner

Primary Examiner—Gabrielle Brouillette
Assistant Examiner—Dah-Wei D. Yuan
(74) Attorney, Agent, or Firm—Merchant & Gould P.C.

(57) ABSTRACT

A solid polymer fuel cell which can stably generate electric power for long, because the cell is enabled to uniformly supply a fuel gas to all anodes by means of extended flow passages which are extended from anode-side flow passages and formed on a anode-side plate on the downstream side of the ends of the anodes in the direction of fuel gas flow, a water absorbing means for nearly uniformly performing water absorption, water retention, and drainage on all channels provided at the ends of the extended flow passages, and a selective gas discharging means for discharging a gas more selectively than water on the upstream side of the water absorbing means. In addition, the power generation characteristics and service life of the fuel cell can be improved further, because the cell can maintain a solid polymer film in a moist state as a whole and can efficiently supply the fuel gas to all anodes by a means for distributing the fuel gas to the inlet sections of the anode-side flow passages and a means for distributing water from a water source to the inlet sections of the anode-side flow passages through holes having a prescribed form and leading to the inlet sections of the anode-side flow passages.

27 Claims, 29 Drawing Sheets

POLYMER ELECTROLYTE FUEL CELL SHOWING STABLE AND OUTSTANDING ELECTRIC-POWER GENERATING CHARACTERISTICS

TECHNICAL FIELD

This invention relates to a polymer electrolyte fuel cell, more specifically, to a polymer electrolyte fuel cell in which fuel gas and water are supplied to anode-side channels to generate electric power.

BACKGROUND ART

Many of commercially practical polymer electrolyte fuel cells are a stack of a plurality of cell units each of which includes a cell sandwiched by a pair of plates in which gas-flow channels are formed, where the cell is composed of an anode, a cathode, and a polymer electrolyte membrane, the polymer electrolyte membrane being disposed between the anode and cathode. The polymer electrolyte fuel cell, when operated, generates electricity through electrochemical reaction while the cathode-side channels are supplied with air as oxidizer and the anode-side channels are supplied with a fuel gas.

Meanwhile, a problem of such polymer electrolyte fuel cells is that the polymer electrolyte membrane needs to be moistened during operation to maintain the ionic conductivity of the membrane. To solve this problem, in many conventional methods, humidified air or humidified fuel gases are supplied to the fuel cells. Japanese Laid-Open Patent Application No. 5-41230 discloses another method in which the fuel gas and water are each supplied through dedicated channels out of a plurality of anode-side channels so that supplying of the fuel gas to the anode and moistening of the polymer electrolyte membrane are both effectively performed and the fuel cell can be cooled.

To secure an excellent cell performance in fuel cells, the fuel gas should be extended to every corner of the anode. For this purpose, care should be taken in this type of polymer electrolyte fuel cells so that the anode-side channels are not blocked with water since it may block the fuel gas flow.

In consideration of this problem, conventional methods allow the fuel gas and water to flow downwards through the channels directed vertically and discharge the fuel gas and water to outside the fuel cell through a common discharge pipe displaced at the lower part of the fuel cell. However, such methods still have a problem that the fuel gas is blocked when meniscuses of water are formed due to capillary phenomenon at the downstream edge of the anode-side channels where three phases (fuel gas exhaust as gas phase, the channel plate as solid phase, and water as liquid phase) gather together.

FIG. 1 shows the problem that the fuel gas is blocked when meniscuses are formed at the downstream edge of the anode-side channels. When such meniscuses are formed, the channels are blocked and the fuel gas is unequally supplied to the anode.

Such channel blockage may be prevented if the channels are widened to prevent the occurrence of the capillary phenomenon. However, widening the channels is not preferable since it increases the electrical resistance in the fuel cell.

For the same purpose, the fuel gas may be supplied at high pressure so that the gas passes through the channels at high speed. In this case, however, an apparatus for supplying the fuel gas at high pressure and collecting it is required. Such a construction is not preferable for achieving compact systems, such as portable ones.

To gain excellent cell performance from polymer electrolyte fuel cells, the polymer electrolyte membrane needs moistening in entirety.

However, this type of conventional polymer electrolyte fuel cells have a problem that different amounts of water run through a plurality of channels. That is to say, among a plurality of anode-side channels, more water is supplied to the channels near upstream of the water distribution path. Accordingly, a part of the polymer electrolyte membrane facing the channels near downstream of the water distribution path is less moistened.

It is possible to solve this problem by increasing the amount of water supply to extend water to every corner of the polymer electrolyte membrane. In this case, however, a pump with a large capacity is required. Moreover, the fuel gas supply effeciency decreases since water is excessively supplied to a part of the channels.

It is therefore an object of the present invention to provide a polymer electrolyte fuel cell in which fuel gas and water are supplied to anode-side channels to generate electric power, where the fuel gas is stably supplied to the anode in entirety and the polymer electrolyte fuel membrane can be moistened in entirety.

DISCLOSURE OF INVENTION

The present invention provides a polymer electrolyte fuel cell in which an extension path is formed on an anode-side plate and a gas-selectively-exhausting means for selectively exhausting gas is formed in a gas loophole which is formed upstream of the end of the extension path, the gas loophole overlaying the extension path. This construction prevents the fuel gas from being blocked in the channels and supplies the fuel gas to the anode in entirety, resulting in stable generation of electric power over time.

The polymer electrolyte fuel cell may include: a means for distributing the fuel gas to the inlet of each anode-side channel; and a water distribution means for distributing water from a water supply source to an inlet of each anode-side channel, where the water distribution means includes a water path space which is adjacent to the inlet of each anode-side channel with a partition plate in between, and the water distribution means distributes water through the water path space and holes with predetermined shapes which are opened in the partition plate. This construction moistens the polymer electrolyte membrane in entirety and effectively supplies the fuel gas to the anode in entirety, resulting in further improvement in electric power generation of the fuel cell and the cell life.

Also, water may be supplied only to certain channels among a plurality of anode-side channels facing the anode. This arrangement contributes to further improvement in supplying the fuel gas to the anode in entirety.

BEST MODE FOR CARRYING OUT THE INVENTION

EMBODIMENT 1
Fuel Cell Structure

Figure 1:
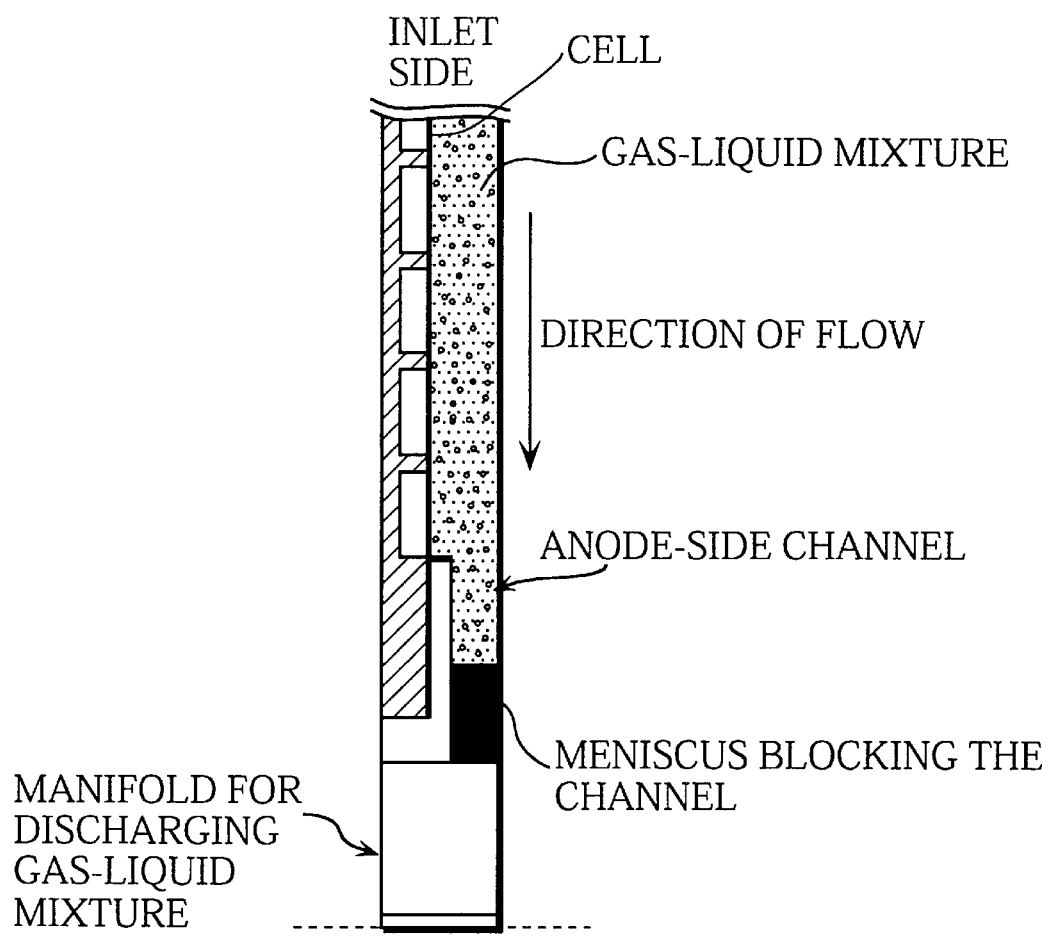
FIG. 1 shows how meniscuses formed at the downstream edge of the anode-side channels block the fuel gas.
Figure 2:
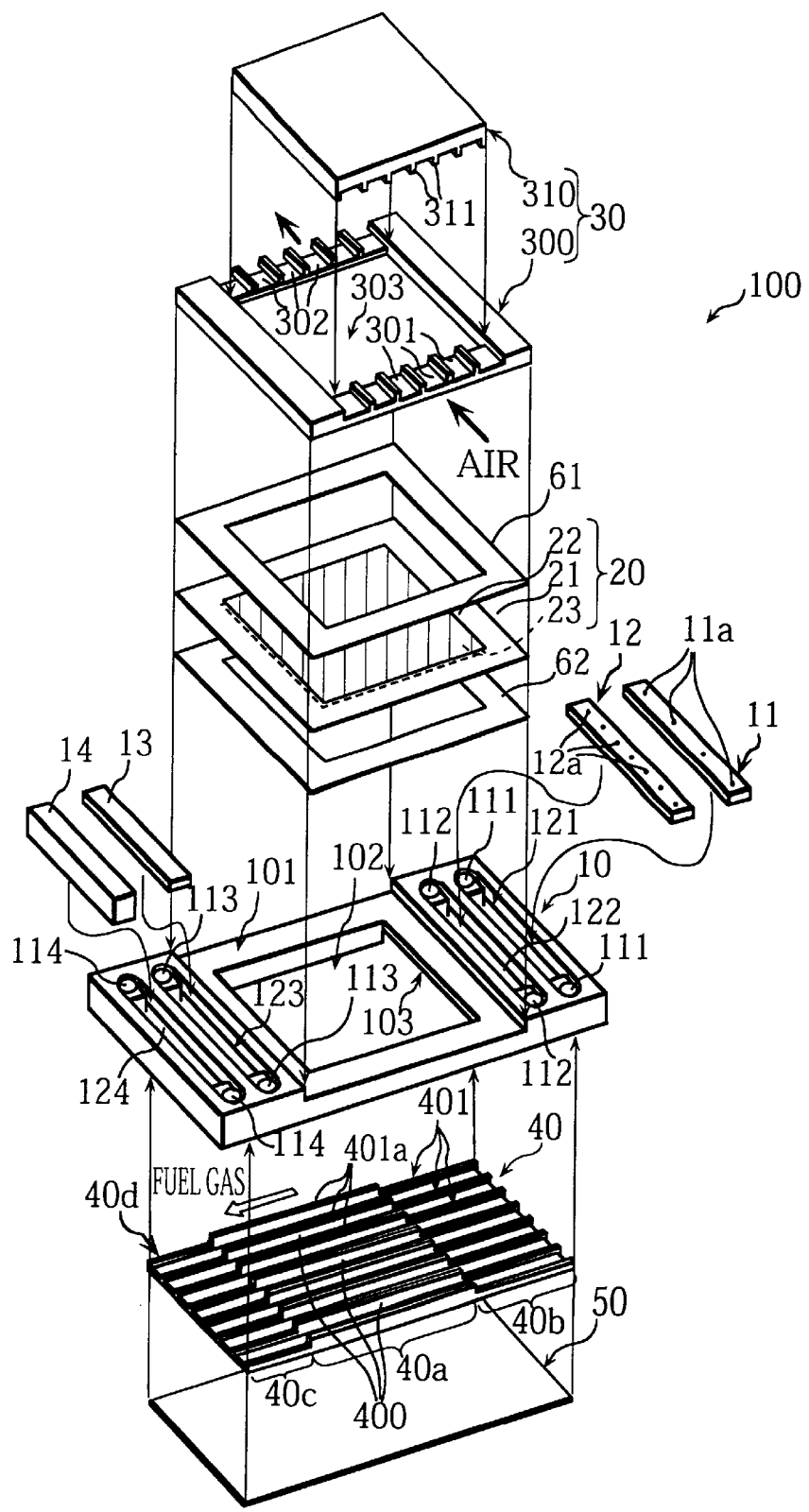
FIG. 2 is an assembly drawing of the cell unit which is a component of the polymer electrolyte fuel cell in Embodiment 1.

FIG. 2 is an assembly drawing of a cell unit 100 which is a basic component of a polymer electrolyte fuel cell 1 (hereinafter referred to as fuel cell 1) of the present embodiment.

As shown in FIG. 2, the cell unit 100 is mainly composed of a frame 10, a cell 20, a cathode-side channel substrate 30, an anode-side channel substrate 40, and a partition plate 50. The cell 20 and cathode-side channel substrate 30 are fitted in one side (upside, in FIG. 2) of the frame 10, and the anode-side channel substrate 40 and partition plate 50 are fitted in the other side (downside, in FIG. 2) of the frame 10.

The cell 20 is composed of a polymer electrolyte membrane 21, a cathode 22, and an anode 23, the polymer electrolyte membrane 21 being sandwiched by the cathode 22 and the anode 23. A plurality of parallel cathode-side channels 311 are formed in the cathode-side channel substrate 30, and a plurality of parallel anode channels 400 are formed on the anode-side channel substrate 40. Note that in FIG. 2, the anode 23 is drawn with a short dashed line since the anode 23 is on the back side of the polymer electrolyte membrane 21.

The fuel gas may be a hydrogen gas or a gas formed by reforming natural gas, propane, butane, or methanol and whose main component is hydrogen.

Figure 5:
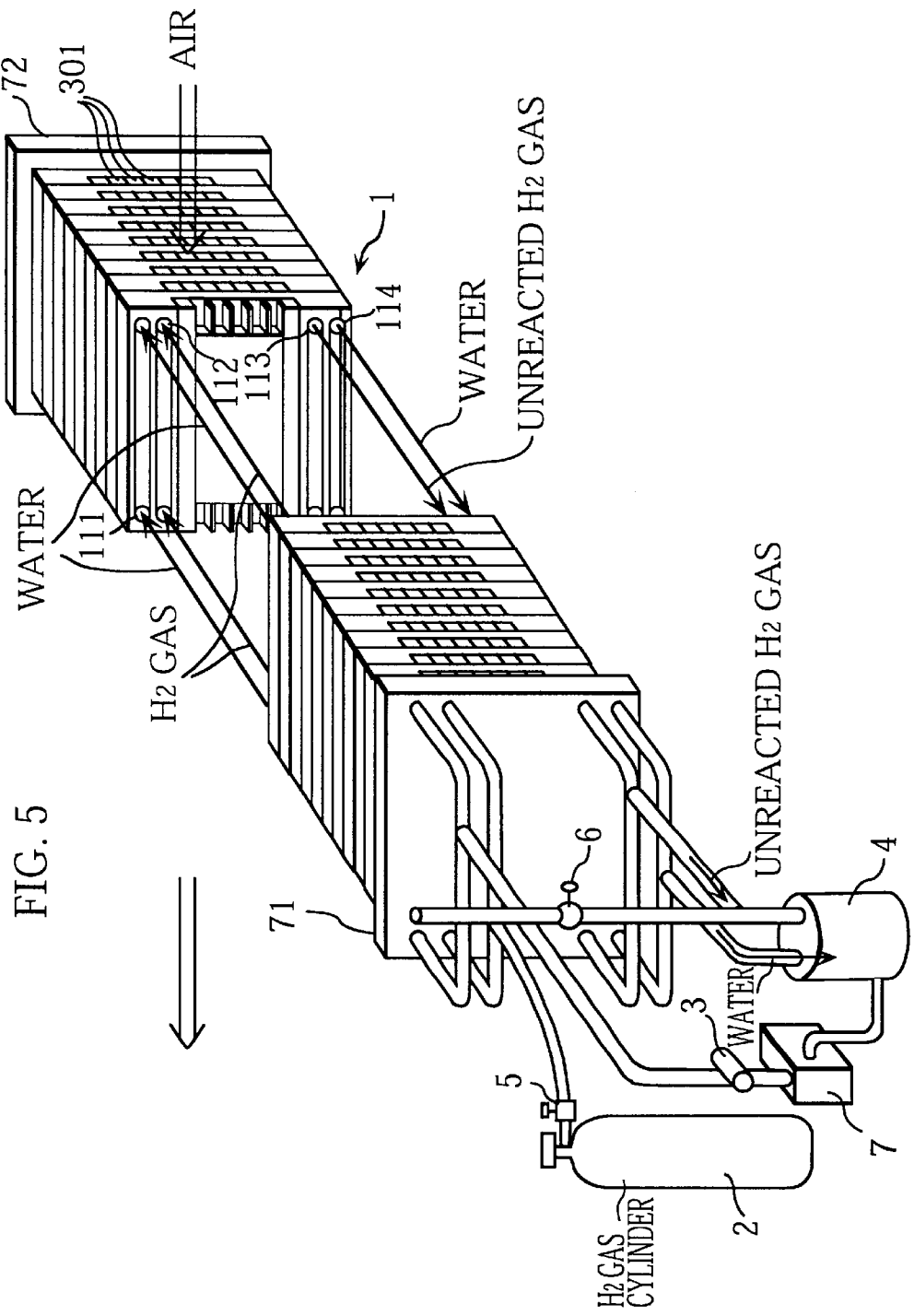
FIG. 5 is a perspective diagram showing the entire construction of the fuel cell of Embodiment 1.

The fuel cell 1 includes a stack of a certain number of cell units 100, the stack being sandwiched by end plates 71 and 72. The end plates 71 and 72 are not illustrated in FIG. 2, but are shown in FIG. 5.

The frame 10 includes a rectangular plate. In the center of one side (upside, in FIG. 2) of the rectangular plate, a cut 101 is formed so that the cell 20 and the cathode-side channel substrate 30 are fitted in the cut 101. On the other side (downside, in FIG. 2) of the rectangular plate, a pit 103 is formed so that the anode-side channel substrate 40 and the partition plate 50 are fitted in the pit 103. A hole referred to as window 102 is opened at the center of the cut 101 to allow the anode 23 to contact the anode-side channel substrate 40. The frame 10 is formed by molding plastic material with the injection molding method.

On one edge of the frame 10 upstream of the fuel gas flow, a pair of manifolds 111 and a slot 121 are formed to supply water, and a pair of manifolds 112 and a slot 122 are formed to supply the fuel gas. On the other edge of the frame 10 downstream of the fuel gas flow, a pair of manifolds 113 and a slot 123 are formed to vent unreacted gas and a pair of manifold5 114 and a slot 124 are formed to vent water.

The slots 121 to 124 are formed to be perpendicular to the anode channels 400. The pairs of manifolds 111 to 114 are respectively formed at both edges of each slot 121 to 124. Also, elliptical surface grooves 131 to 134 (see FIG.3) are formed on the frame 10 to connect respective pairs of manifolds 111 to manifolds 114.

The polymer electrolyte membrane 21 is a thin membrane made of perfluorocarbon sulfonic acid. The cathode 22 and the anode 23 are layers made of carbon supported platinum and have a certain thickness. The cathode 22 and the anode 23 are bonded to both sides of the polymer electrolyte membrane 21 at the center with the hot press method.

The cathode-side channel substrate 30 is composed of a frame 300 and a channel plate 310, where the channel plate 310 is fitted in the frame 300.

The channel plate 310 is a plain plate made of carbon porous material. The cathode-side channels 311 are formed on a surface (downside in FIG. 2) of the channel plate 310 facing the cathode 22.

The frame 300 is a rectangular plate made of plastic, a window 303 being opened at the center thereof. Channels 301 and channels 302 are formed on a surface (upside in FIG. 2) of the frame 300 with the cathode 22 at its back, where the channels 301 are used to lead air to the cathode-side channels 311, and the channels 302 are used to release air from the channels 311.

A gasket 61 is formed between the cathode-side channel substrate 30 and the cell 20; a gasket 62 is formed between the cell 20 and the cut 101.

The anode-side channel substrate 40 is a rectangular plate made of carbon porous material and is smaller than the frame 10. A plurality of anode-side channels 400 are formed in parallel on the anode-side channel substrate 40, the channels 400 being each sandwiched by ribs 401.

The anode-side channel substrate 40 is composed of a center part 40a, an upstream part 40b, and a downstream part 40c, where the locations are referred to in terms of the fuel gas flow. The ribs of the center part 40a are higher than the upstream part 40b and the downstream part 40c. The highest ends 401a of the center part 40a fit in the window 102 so that the center part 40a electrically contact the anode 23.

It should be noted here that although omitted in FIG. 2, current collectors 24 and 25, made of water-repellent carbon paper, are respectively sandwiched between the cathode 22 and the cathode-side channel substrate 30 and between the anode 23 and the anode-side channel substrate 40. See FIG. 7B.

The partition plate 50, being a hermetical glassy carbon plate with the same size as the anode-side channel substrate 40 and displaced between the cathode-side channel substrate 30 and the anode-side channel substrate 40, prevents the air flowing through the cathode-side channels 311 and the fuel gas flowing through the anode-side channels 400 from mixing, while conducting electricity between the cathode-side channel substrate 30 and the anode-side channel substrate 40.

Figure 3:
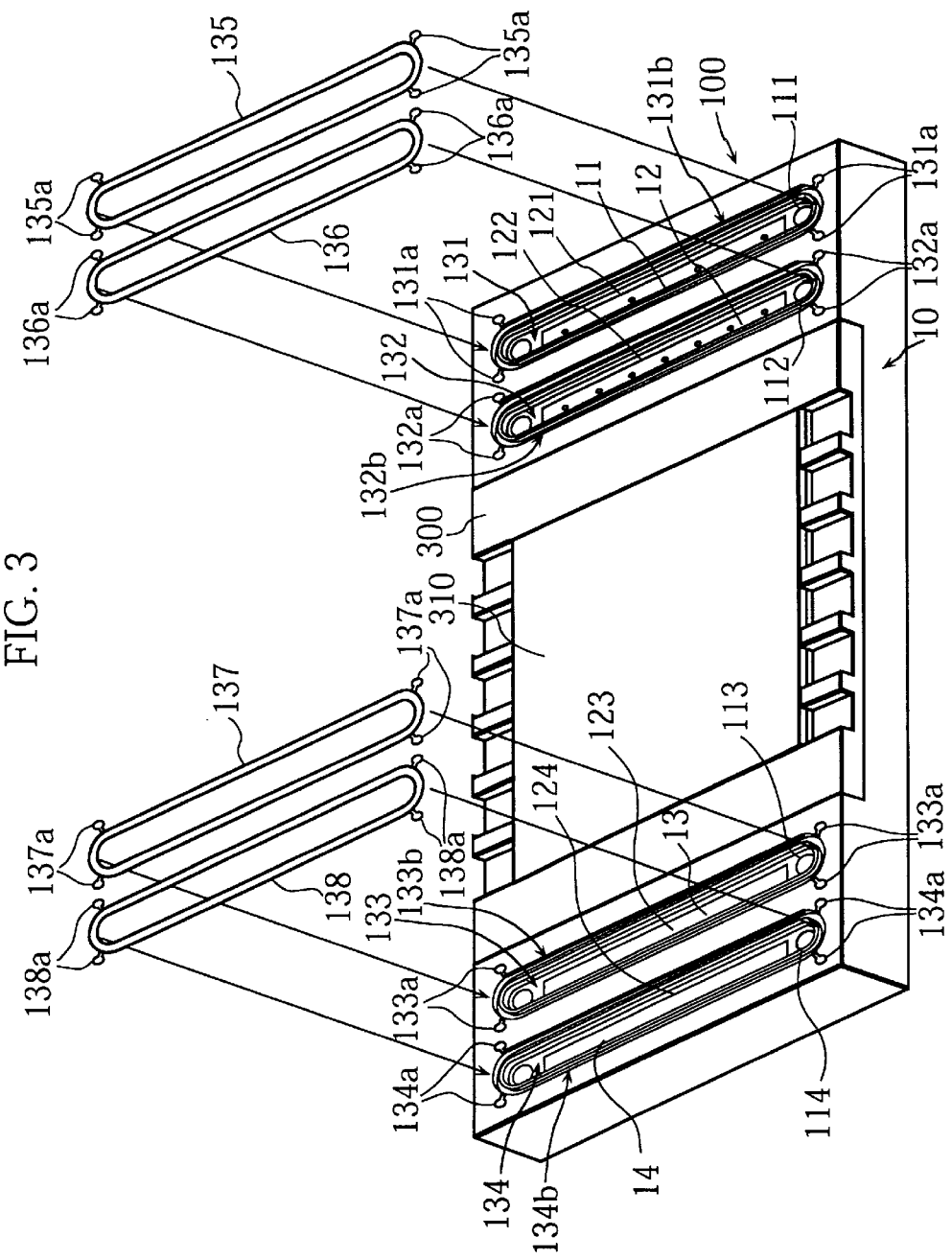
FIG. 3 shows how rings are fitted into surface grooves of the frame of the cell unit.

As shown in FIG. 3, when the cell units 100 are stacked to form a fuel cell, rings 135 to 138 are respectively fitted into the ring holders 131b to 134b at rims, in other words, into surface grooves 131 to 134 of the frame 10. The rings 135 to 138, sandwiched between the frames 10, function as seals.

Four projections 135a are formed at four corners of the ring 135. Similarly, projections 136a to 138a are respectively formed at corners of the rings 136 to 138. The projections 135a to 138a are respectively fitted in the projection holders 131a to 134a on the frame 10 which are formed by drilling the surface of the frame.

Figure 4:
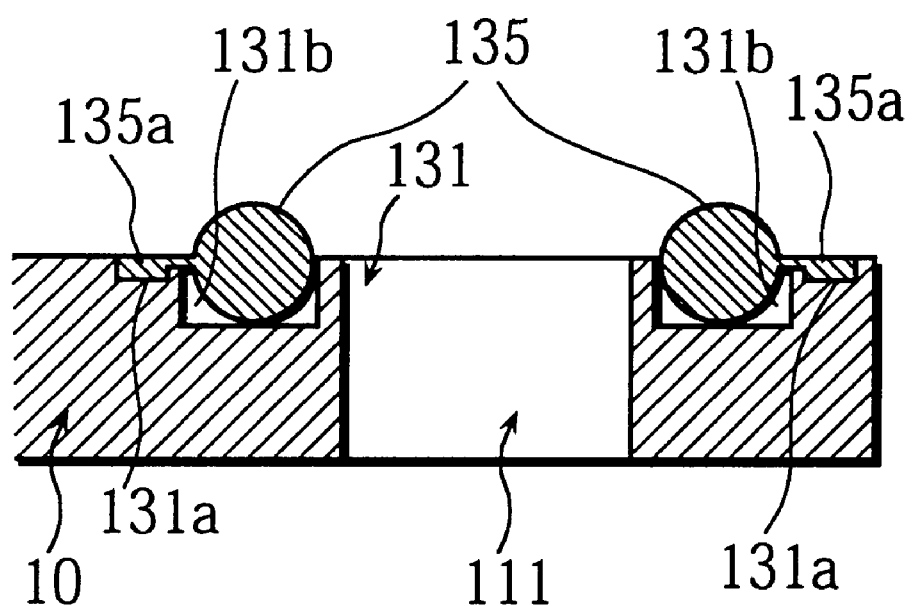
FIG. 4 shows a section including projections at a ring.

FIG. 4 shows a section including projections at a ring. As shown in this drawing, the projections 135a of the ring 135 are firmly fitted in the projection holders 131a of the frame 10.

As understood from this, the rings 135 to 138 are firmly fixed at the ring holders 131b to 134b since at the same time, the projections 135a to 138a are fitted in the projection holders 131a to 134a of the frame 10.

This construction prevents the rings 135 to 138 from disjoining or moving when cell units 100 are carried by hand or moved for adjustment of the position while the cell units are stacked.

Operation of Fuel Cell

FIG. 5 is a perspective diagram showing the entire construction of the fuel cell 1 and its operation. The present embodiment describes a case in which hydrogen gas is used as the fuel gas.

As shown in FIG. 5, when the fuel cell 1 is operated, it is placed so that air flows through the channels (cathode-side channels) horizontally.

A fan (not illustrated) is used to send air to the channels 301. The air flows through the cathode-side channels 311 providing oxygen to the cathode 22, and is exhausted from the channels 302.

Hydrogen gas is supplied through the inner manifolds 112 from a hydrogen gas cylinder 2; water is supplied through the inner manifolds 111 from a water pump 3.

The supplied water and hydrogen gas are distributed to the plurality of cell units 100. In each cell unit 100, the water and hydrogen gas are supplied to the upstream part 40b through the slots 121 and 122, respectively. The water and hydrogen gas then flow downstream through the anode-side channels 400 to supply the hydrogen gas to the anode 23 and humidify the polymer electrolyte membrane 21.

The amount of water provided from the water pump 3 is adjusted in accordance with a water pressure value measured at the slot 121 through which water is supplied.

The pressure for supplying the hydrogen gas is adjusted by a regulator 5. Generally, a proper pressure for the gas supply is considered to be in a range of 10 mm $H_2O$ to 100,000 mm $H_2O$, more specifically, in a range of 100 mm $H_2O$ to 800 mm $H_2O$. The pressure for exhausting the unreacted hydrogen gas is adjusted by a regulator 6. The exhaust pressure is adjusted so that the fuel utilization in the fuel cell 1 is 90% or more.

The unreacted hydrogen gas, after having passed through the anode-side channels 400, passes through the slot 123 then the manifolds 113 to be emitted from each cell unit and from the fuel cell eventually. The water, after having passed through the anode-side channels 400, passes through the slot 124 then the manifolds 114 to be emitted from each cell unit and from the fuel cell eventually.

As apparent from the above description, the fuel gas and water, a liquid, are emitted separately. As a result, it is possible to collect and reuse the emitted gas without allowing a separation tank 4 to pass through the gas.

The separation tank 4 collects: water emitted from the fuel cell 1; and water condensed from vapor steam included in the exhausted gas. The collected water is cooled in a cooler 7 and is supplied again to the fuel cell 1 through the water pump 3. By using fluororesin pipes as pipes such as the pipes for conveying water from the water pump 3 to the fuel cell 1, it is possible to prevent water leakage at pipe joints since the fluororesin pipes are more flexible than stainless pipes and relax the heat stress acted on the pipe joints during the cyclical operation.

Construction and Effects of Anode-Side Channels

In the upstream area, a water distribution plate 11 is fitted in the slot 121 with a ring (not illustrated) in between, and a gas distribution plate 12 is fitted in the slot 122 with a ring (not illustrated) in between.

The water distribution plate 11 and the gas distribution plate 12, both contacting the upstream area of the anode-side channel substrate 40, are narrow, thin, rectangular plates with pores 11a and 12a respectively opened. The pores 12a of the gas distribution plate 12 correspond to the anode-side channels 400 in one-to-one relation. On the other hand, the pores 11a of the water distribution plate 11 only correspond to certain water supply channels among the anode-side channels 400.

The certain water supply channels are selected equally out of the anode-side channels 400 with a proper distance in between when the fuel cell 1 is designed. It is desirable that the water supply channels are positioned at intervals of one or two anode-side channels.

The water distribution plate 11 and the gas distribution plate 12 may be achieved by, for example, metal (stainless steel such as SUS304 or SUS316, or Ti steel) thin plates, ceramic ($Al_2O_3$, etc.) thin plates, or plastic (polyester, ABS, perphenil oxide, PPE, PPS, etc.) thin plates, with pores opened.

The pores 11a are the same in their shape (e.g., circle, ellipse, or polygon), size, and the number per channel (e.g., one, two, three).

It is desirable that the thickness of the water distribution plate 11 and the diameter of the pores 11a are set so that an appropriate resistance (pressure loss) is generated when water passes through the pore 11a. Practically, it is desirable that the thickness of the water distribution plate 11 is set to a range of 120 μm to 5 mm, and the diameter of the pores 11a to a range of 20 μm to 3 mm.

As shown in FIG. 2, in the downstream area, a gas-permeable plate 13 is fitted in the slot 123. The gas-permeable plate 13, contacting the downstream part 40c of the anode-side channel substrate 40, selectively exhausts gas. The gas having permeated the gas-permeable plate 13 flows smoothly to the manifolds 113 via the surface groove 133.

Materials that can be used for the gas-permeable plate 13 are: water-repellent carbon paper; porous membrane made of ethylene tetrafluoride resin; porous membrane made of ethylene tetrafluoride resin supported by polyester, polyolefin, polytetrafluoroethylene (PTFE), tetrafluoroethyleneperfluoroalkyl (PFA) vinyl ether copolymer, glass, and polypropylene (PP); and polyester fiber coated with polyurethane.

A spongy material 14 is fitted in the slot 124. The spongy material 14, contacting the downstream part 40c of the anode-side channel substrate 40, promptly sucks the water sent through the anode-side channels 400, and preserves the water equally for each channel, and smoothly emits the water. See FIG. 6.

The spongy material 14 is preferably achieved by weave, nonwoven, or felt whose major component is: polyester; rayon; nylon; polyester/rayon; polyester/acrylic; or rayon/polychlal.

Figure 6:
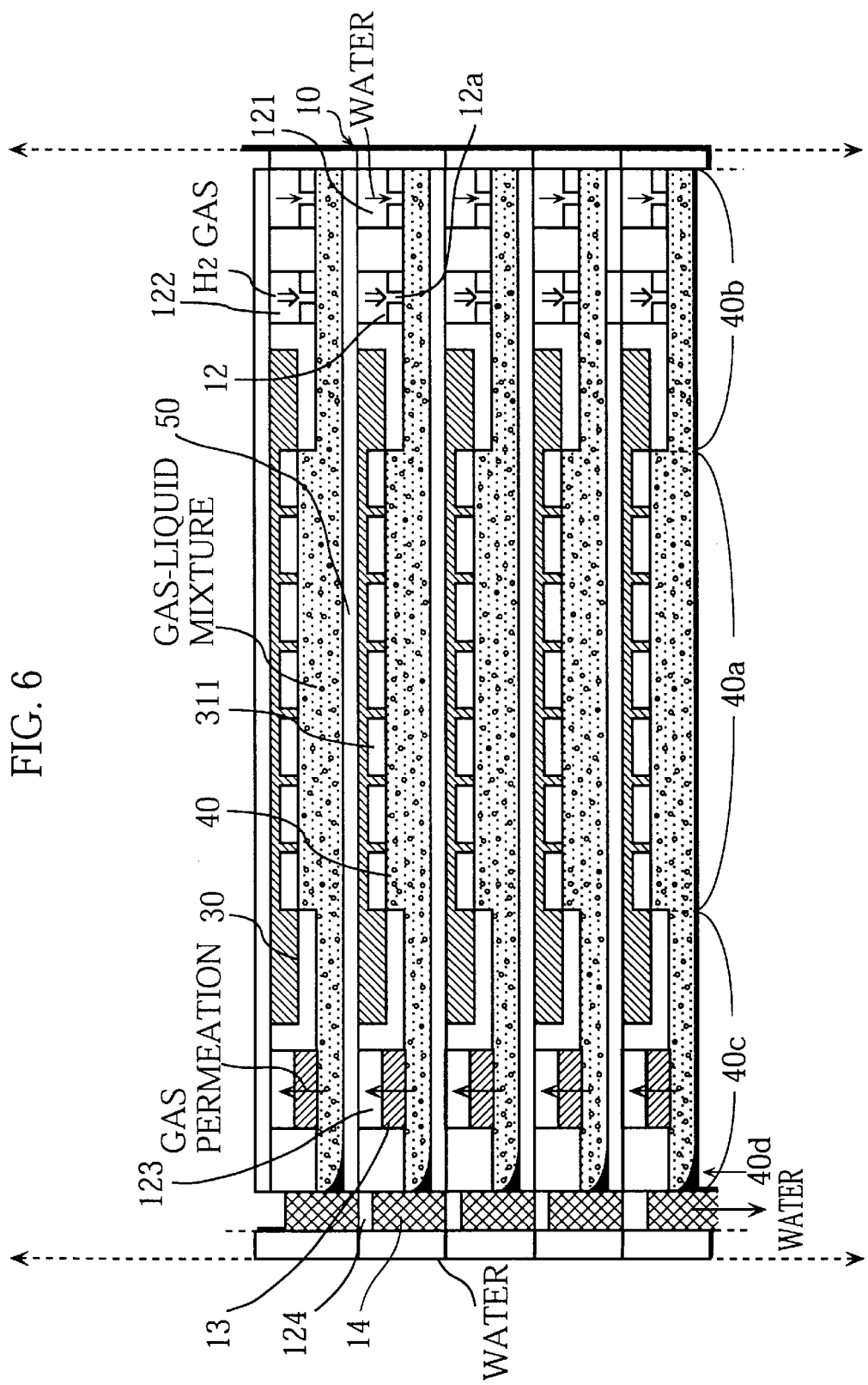
FIG. 6 is a sectional view of the above fuel cell taken along the water supply channels.

FIG. 6 is a sectional view of the fuel cell 1 taken along the water supply channels, and shows the generation, flow, and discharge of the gas-liquid mixture in the channels.

Figure 7:
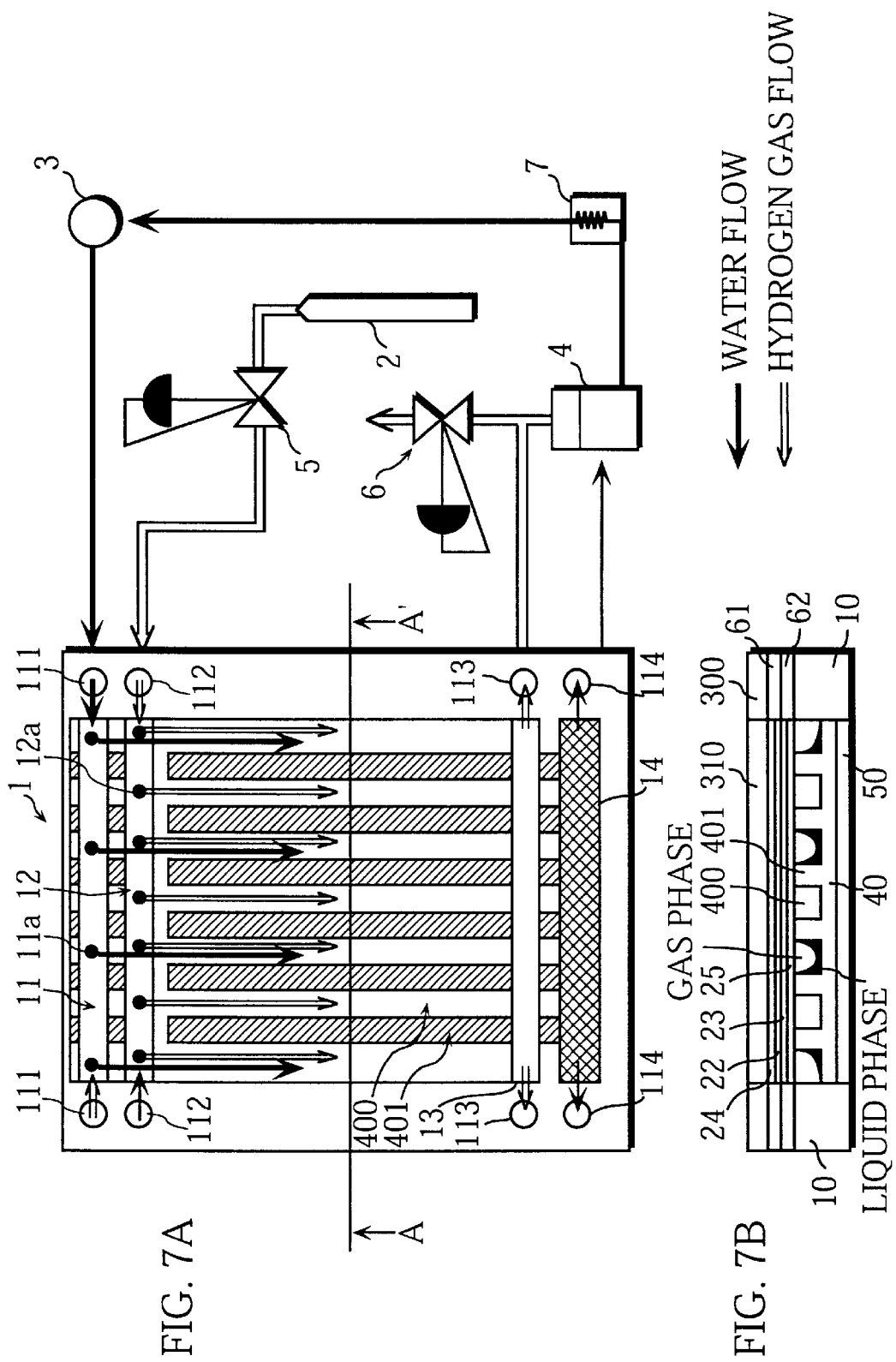
FIGS. 7A and 7B show the construction and operation of the above fuel cell.

FIGS. 7A and 7B show the operation of the fuel cell 1. FIG. 7A is a top plan view of the cell unit 100. FIG. 7B is a sectional view of the cell unit 100 taken along the line A–A'. Note that in the example shown in FIGS. 7A and 7B, the water supply channels are positioned at intervals of one anode-side channel.

The fuel cell 1 with the above-described construction has the following effects.

Effect 1

Both water and fuel gas are supplied to the water supply channels through the pores 11a, and the water and fuel gas are mixed in the water supply channels to generate the gas-liquid mixture. The gas-liquid mixture flowing through the water supply channels supplies the fuel gas to the anode, humidifies the polymer electrolyte membrane, and functions as a cooling medium for cooling the fuel cell.

The anode-side channels other than the water supply channels, or channels which do not correspond to the pores 11a, are supplied only with the fuel gas. The fuel gas flowing through these channels is supplied to the anode. Water is not directly supplied to these channels. However, these channels are humidified by the moisture which is generated and diffused as the gas-liquid mixture flows through nearby water supply channels. As understood from this, the polymer electrolyte membrane 21 is humidified as far as the diffused moisture reaches.

Accordingly, with the water supply channels arranged as described above, it is possible to humidify as large polymer electrolyte membrane 21 as the anode 23.

For example, when the water supply channels are positioned at intervals of one anode-side channel as shown in FIG. 7A, each channel sandwiched by adjacent water supply channels receives moisture diffused from the adjacent water supply channels. When the water supply channels are positioned at intervals of two anode-side channels, each channel other than the water supply channels mainly receives moisture diffused from the adjacent water supply channel.

Accordingly, in both cases, a part of polymer electrolyte membrane 21 as large as the anode 23 is moistened.

On the other hand, when the water supply channels are positioned at intervals of three anode-side channels, some channels are not adjacent to the water supply channels. It is considered to be difficult for such channels to receive moisture.

Effect 2

If a porous plate was used as the water distribution plate, much water would flow near the manifolds 111 and less water would flow at areas distant from the manifolds 111. In contrast, in case of the present embodiment in which the water distribution plate has the pores 11a of a certain shape, water is not ejected from the pores unless a certain level of water pressure is applied to them. As a result, the water distribution plate of the present embodiment distributes water more equally than the porous plate. This will be discussed in detail in Embodiment 7.

Effect 3

The water distribution plate of the present embodiment has as many pores as the water supply channels. Therefore, it has less number of pores than a case in which as many pores as the anode-side channels 400 are opened. As a result, the water distribution plate of the present embodiment can distribute smaller amount of water equally than the above case, and humidify as large polymer electrolyte membrane 21 as the anode 23.

Effect 4

It goes without saying that the anode-side channels 400 other than the water supply channels supply the fuel gas to the anode 23 excellently. Also, the fuel gas contained in the gas-liquid mixture is supplied to the anode 23 relatively effectively since, as described above, even small amount of water is equally supplied to the water supply channels. Therefore, the fuel gas is effectively supplied to the whole area of the anode 23.

Effect 5

In the fuel cell 1, the spongy material 14 disposed to contact an end part 40d downstream of the anode-side channels 400 performs suction, preservation, and discharge of water substantially equally for each channel, and a mechanism for selectively exhausting the gas is disposed a little upstream of the end part 40d. With this construction, gas and water are equally distributed to the channels. This construction prevents deterioration of the cell performance due to unequal distribution of the fuel gas caused by a partial block in the path of the fuel gas flow.

Effect 6

The anode-side channel substrate 40 is made of a hydrophilic carbon porous material, while the current collector 25 disposed on the anode 23 has been processed to be water-repellent. As a result, inside of the channels 400, the contact angle of the water to the surface of the anode-side channel substrate 40 is smaller than that to the surface of the current collector 25.

Accordingly, the liquid phase and the gas phase tend to separate from each other when the gas-liquid mixture flows through the channels 400. That is, when the gas-liquid mixture flows through the channels 400, water is attracted by the substrate 40, so that the substrate 40 has the liquid phase mainly composed of water and that the anode 23 (current collector 25) side has the gas phase mainly composed of the fuel gas and moisture. With this construction, the fuel gas is effectively supplied to the anode 23. Also, due to the separation of gas from water, the gas phase directly contacts the gas-permeable plate 13. As a result, the possibility that the selective permeation of gas by the gas-permeable plate 13 is interfered by water becomes smaller. This makes it possible to maintain an excellent gas permeation efficiency.

EMBODIMENT 2

The fuel cell of the present embodiment is the same as Embodiment 1 except that water is supplied to all of the anode-side channels 400, and that water is supplied more upstream than the fuel gas.

More specifically, in the present embodiment, in the cell unit 100 shown in FIG. 2, the water distribution plate 11 is not fitted in the slot 121. The fuel gas is supplied to the manifolds 111, then distributed to the anode-side channels 400 through the slot 121. A water distribution plate, which is the same as the gas distribution plate 12 with pores corresponding to the anode-side channels 400, is fitted into the slot 122. Water is supplied to the manifolds 112, then distributed to the anode-side channels 400 through the pores.

Figure 8:
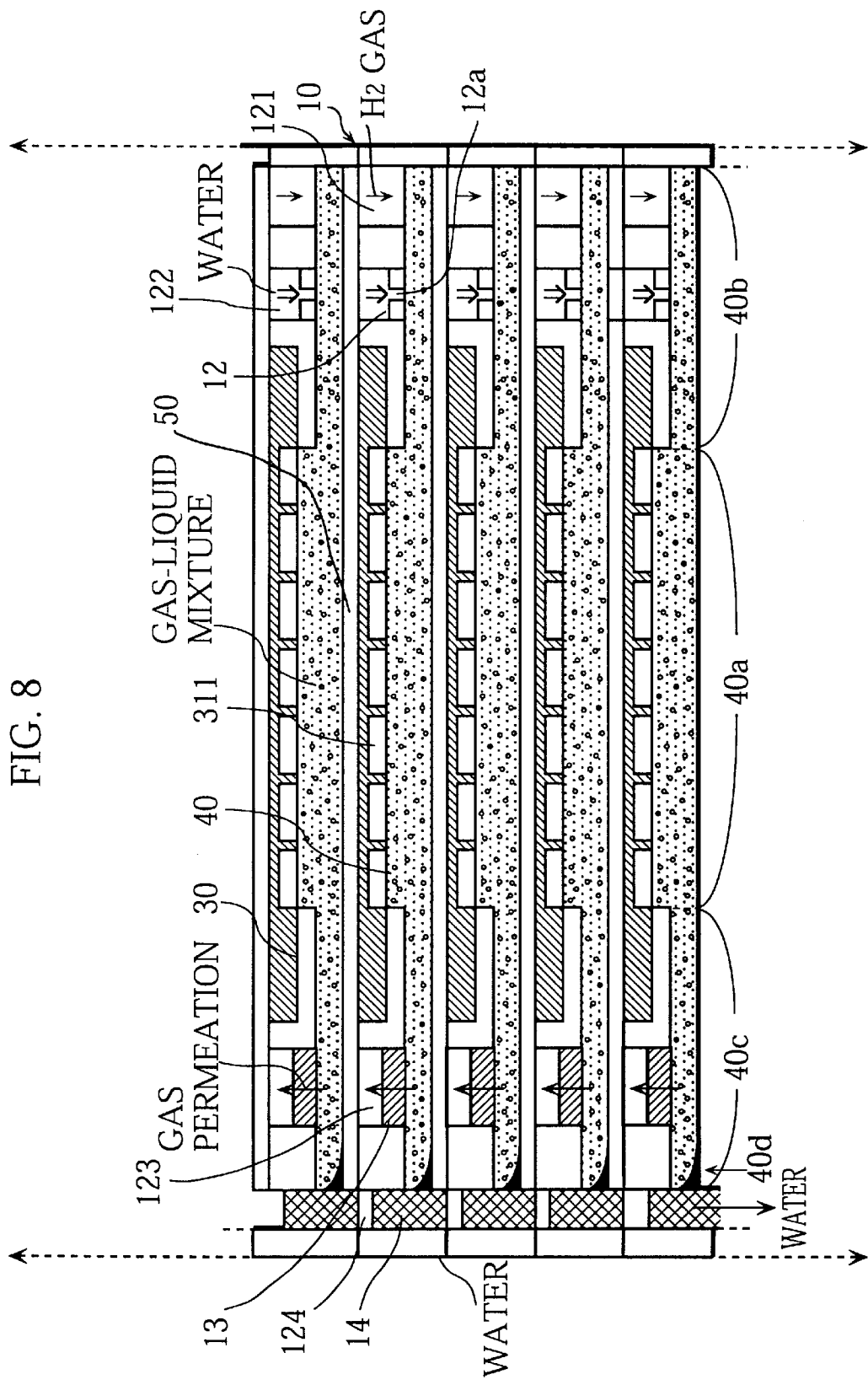
FIG. 8 is a sectional view of the fuel cell of Embodiment 2 taken along the anode-side channels.

FIG. 8 is a sectional view of the fuel cell of the present embodiment taken along the anode-side channels, and shows the generation, flow, and discharge of the gas-liquid mixture in the channels.

In the present embodiment, the gas-liquid mixture is generated in and flows through each of the anode-side channels. As in Embodiment 1, the gas-permeable plate 13 selectively allows the gas to permeate itself, and the gas is exhausted, separated from water.

EMBODIMENT 3

Figure 9:
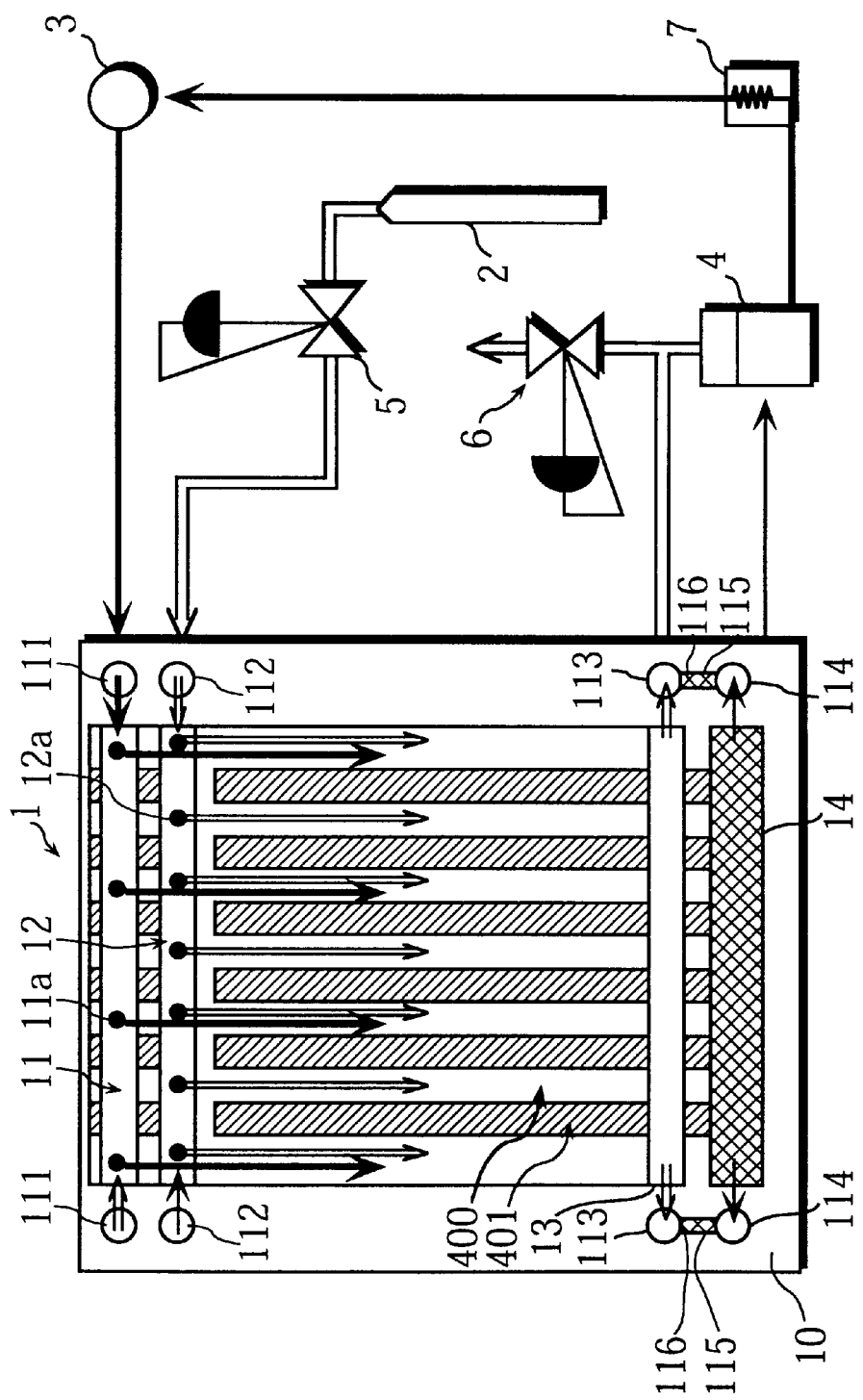
FIG. 9 shows the construction of the cell unit of Embodiment 3.

FIG. 9 shows the operation of the fuel cell of the present embodiment, and is, like FIG. 7A, a top plan view of the cell unit.

The fuel cell of the present embodiment is the same as Embodiment 1 except that, as shown in FIG. 9, on the surface of the frame 10, two drain slots 115 are formed. Each drain slot 115 is formed between and connects a manifold 113 for exhausting gas and a manifold 114 for discharging water. A spongy material 116, which is the same as the spongy material 14, is fitted in the drain slot 115 to form a drain path.

During the operation of the fuel cell, especially during the operation with a high fuel utilization factor, the water contained in the gas is sometimes condensed in the manifolds 113 for exhausting gas. However, the water in the manifolds 113 is guided to the manifolds 114 (for discharging water) through the spongy material 116 fitted in the drain slot 115. With this construction, the blockage of the manifolds 113 by the condensed water is avoided.

On the other hand, when the gas passing through the manifolds 113 is not saturated with moisture, the water sucked in the spongy material 116 vaporizes in the gas.

Note that the edge of the spongy materials 116 extends towards inside of the manifolds 113. With this construction, the water in the manifolds 113 are effectively sucked, and the water easily vaporizes in the gas in the manifolds 113.

Note that the drain slots 115 and the spongy materials 116 may be formed in the fuel cell of Embodiment 2. This generates the same effects.

EMBODIMENT 4

The fuel cell of the present embodiment is the same as Embodiment 2 except that a slit formation plate 15 replaces the gas-permeable plate 13 to selectively exhaust the gas in the gas-liquid mixture.

Figure 10:
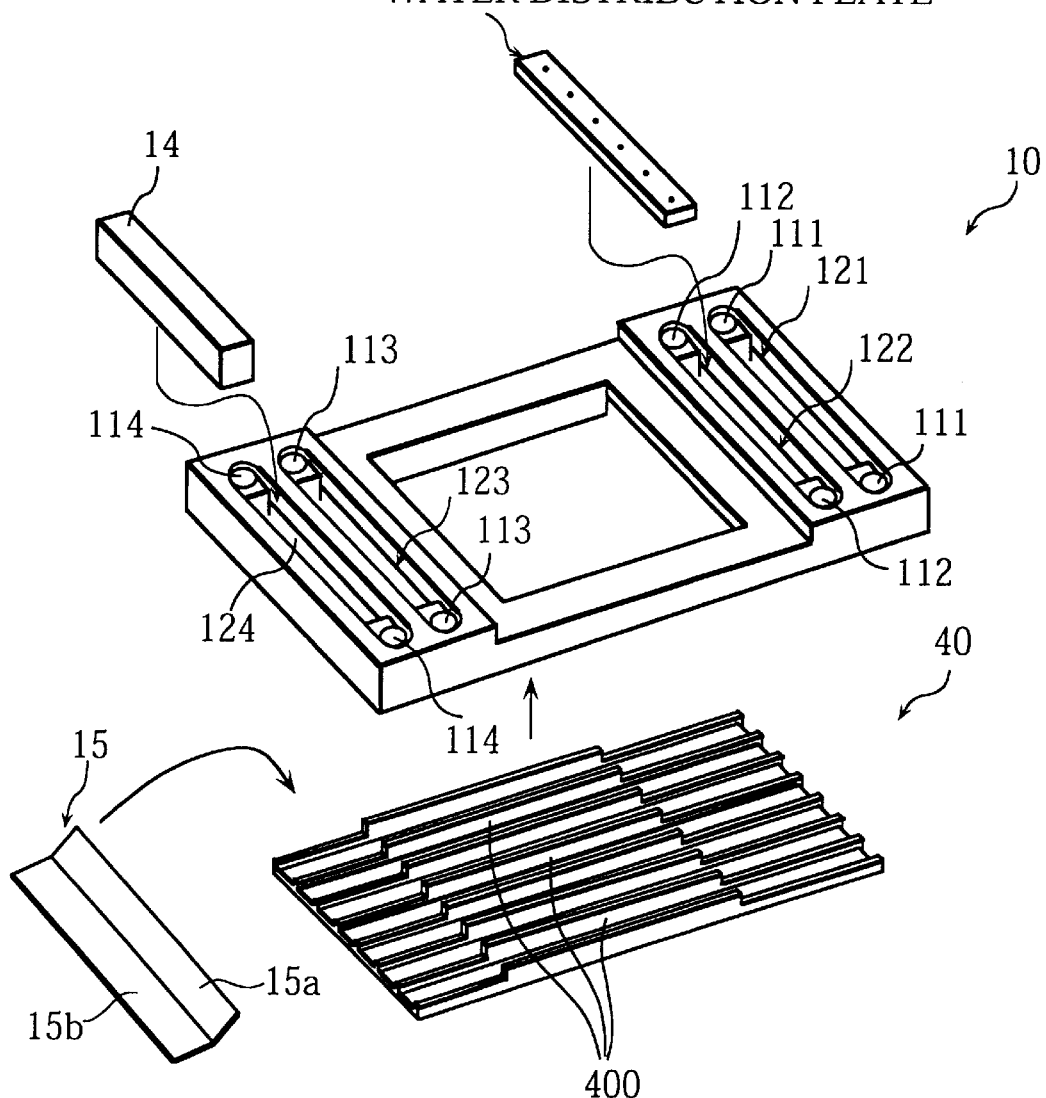
FIG. 10 is an assembly drawing of a main part of the cell unit which constitutes the fuel cell of Embodiment 4.
Figure 11:
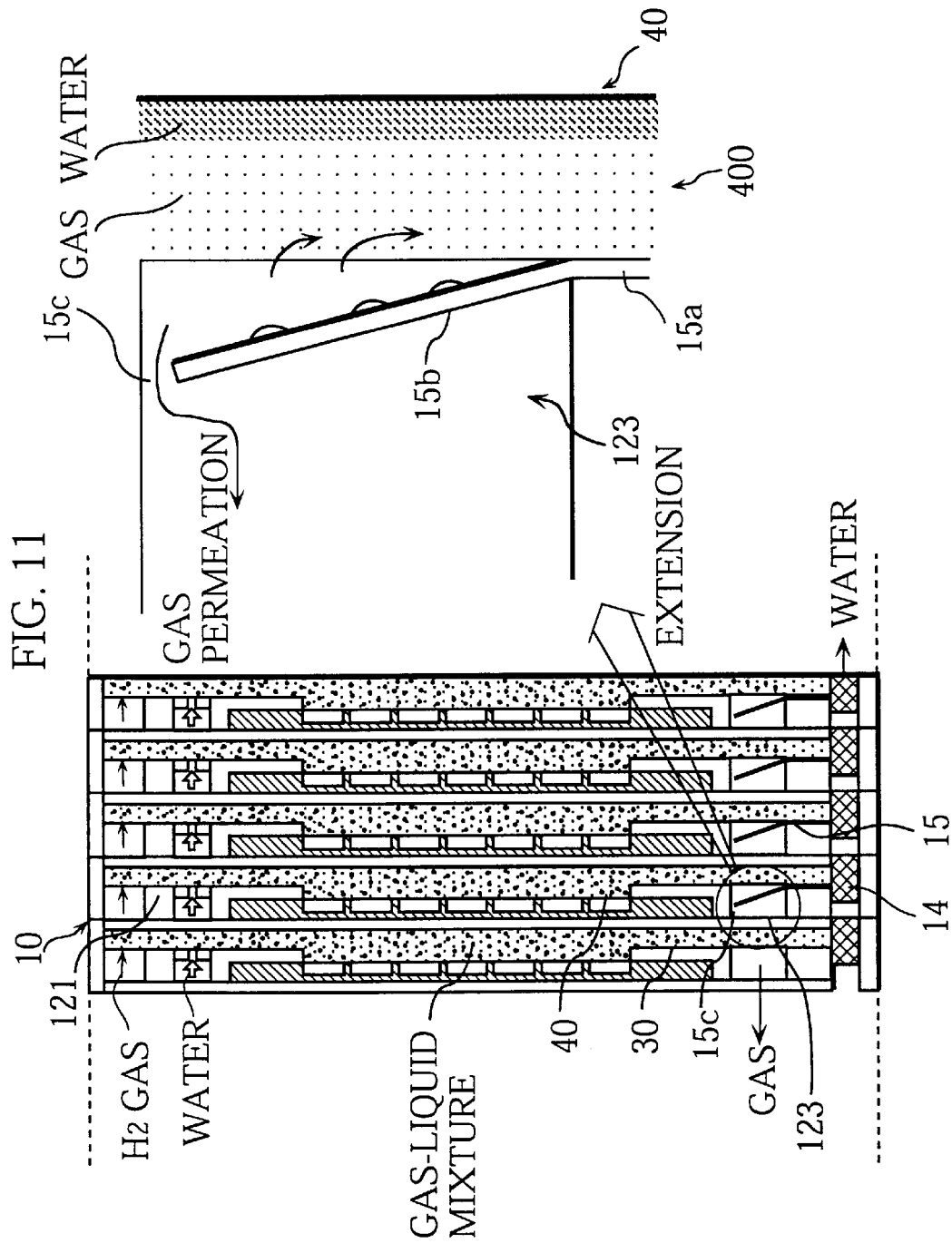
FIG. 11 is a sectional view of the fuel cell shown in FIG. 10 taken along the anode-side channels.

FIG. 10 is an assembly drawing of a main part of the cell unit which constitutes the fuel cell of the present embodiment. FIG. 11 is a sectional view of the fuel cell taken along the anode-side channels.

As shown in the above drawings, the slit formation plate 15 is a plate bended along the direction of the length. The slit formation plate 15 is divided into two parts: a support part 15a; and a shield part 15b. The slit formation plate 15 is attached along the slot 123.

The slit formation plate 15 is formed so that the support part 15a is held between the anode-side channel substrate 40 and the frame 10, that the shield part 15b shields most of the slot 123, and that a slit 15c is formed between the shield part 15b and the inside of the slot 123 so that gas can pass through the slit 15c.

As shown in FIG. 11, as the gas-liquid mixture passes through the anode-side channels 400, water in the mixture is attracted by the channels 400 and separates from the mixture, and mainly the gas passes near the slit formation plate 15. The shield part 15b is slant so that the gas flow path becomes narrower as the path nears the gas permeation. With this construction, most of the water contained in the gas approaching the slit 15c attaches to the shield part 15b. The water having attached to the shield part 15b returns to the channels 400. As a result, the slit 15c is not blocked by the water.

With the above-stated construction, the gas contained in the gas-liquid mixture passing through the anode-side channels 400 passes through the slit 15c to be selectively exhausted.

The slit formation plate 15 may be applied to the fuel cell of Embodiment 1. This combination generates the same effects as the gas-permeable plate 13 of Embodiments 1 and 2.

In the present embodiment, as in the earlier embodiments, it is preferable to dispose the anode-side channels 400 vertically.

The present embodiment shows an example in which the slit formation plate 15 is used to form the slit 15c. However, the same effects will be obtained by narrowing the width of the slot 123. Alternatively, to obtain the same effects, an opening, slit-like or not, may be formed upstream of a water clogging area and downstream of the end of the anode.

EMBODIMENT 5

The fuel cell of the present embodiment is the same as Embodiment 2 except that a hydrophilic material is placed inside the anode-side channels 400 on the anode-side channel substrate 40 to form water-holding layers in the channels along the direction of flow.

Figure 12A:
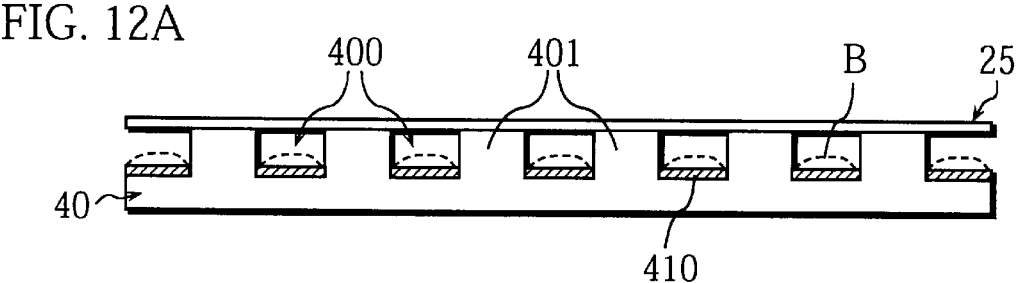
FIGS. 12A, 12B, 12C, and 12D show water holding layers in Embodiment 4.
Figure 12B:
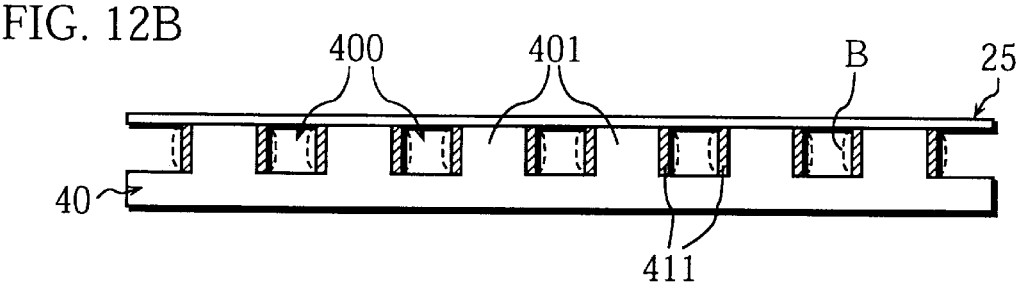
Figure 12C:
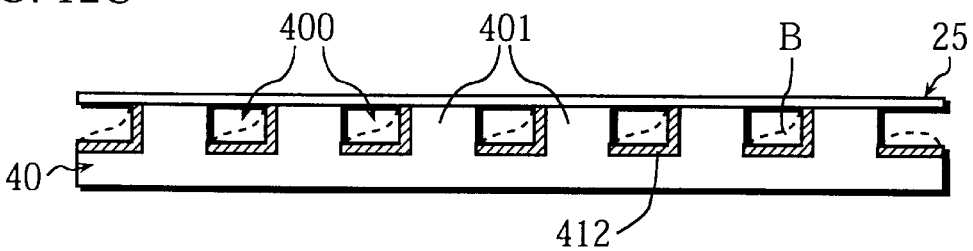
Figure 12D:
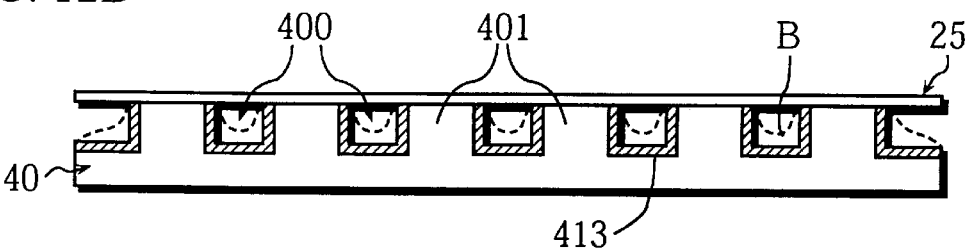

The hydrophilic material may be placed: on the bottom of the anode-side channels 400 like a water-holding layer 410 shown in FIG. 12A; on both inner sides of the anode-side channels 400 like a water-holding layer 411 shown in FIG. 12B; on the bottom and one inner side of the anode-side channels 400 like a water-holding layer 412 shown in FIG. 12C; or on all inner surfaces of the anode-side channels 400 like a water-holding layer 413 shown in FIG. 12D.

Such water-holding layers can be easily placed by sticking a strip of the same hydrophilic material as the spongy material 14 to the bottom or inner sides of the anode-side channels 400.

Alternatively, a paint containing hydrophilic grains such as grains of silica (e.g., a paint made by kneading silica, acrylic resin, and melamine resin) may be applied to the bottom or inner sides of the anode-side channels 400, which is another way of easily placing the water-holding layers in the channels.

With the construction in which water-holding layers are placed in the anode-side channels 400, the gas-liquid mixture separates into the gas and liquid phases, and the liquid phase contacts the water-holding layers and the gas phase contacts the anode when they flow through the anode-side channels 400. As a result, the fuel gas is effectively supplied to the anode 23.

In FIGS. 12A to 12D, the short dashed lines indicate the tendencies in the surfaces of the liquid and gas phases.

Here, a comparison between water-holding layers 410 to 413 shown in FIGS. 12A to 12D shows that water-holding layer 412 shown in FIG. 12C or layer 413 shown in FIG. 12D holds water more stably and allows the gas-liquid mixture to separate more clearly into the gas and liquid phases than water-holding layer 410 shown in FIG. 12A or layer 411 shown in FIG. 12B due to the water-holding layers in two directions.

When water-holding layers made of a non-conductive hydrophilic material are placed on the surface of the ribs 401, current is not collected since conductivity is lost between the anode 23 and the anode-side channel substrate 40. On the other hand, when water-holding layers made of a conductive hydrophilic material (e.g., when a paint made of a non-conductive hydrophilic material containing carbon and silica is applied) are placed on the surface of the ribs 401, current is collected since the area between the anode 23 and the anode-side channel substrate 40 becomes conductive. Accordingly, in case the water-holding layers are made of a conductive hydrophilic material, the layers may be placed on all surfaces of the anode-side channels 400.

When the water-holding layers are placed in inside of the anode-side channels 400, as in the present embodiment, the effects do not change even if the anode-side channel substrate 40 itself is not hydrophilic or water-holding.

Accordingly, the same effects are obtained even if a low-hydrophilic material instead of the carbon porous material is used as the material of the anode-side channel substrate 40. One example of the low-hydrophilic material is a molded mixture of a resin such as phenol with a carbon such as expanded graphite, graphite, or Furness Black.

Note that the same effects will be obtained when one of the water-holding layers 410 to 413 is placed on the water supply channels in the anode-side channels 400 of Embodiment 1.

EMBODIMENT 6

The fuel cell of the present embodiment is the same as Embodiment 2 except that a carbon mold, namely a molded mixture of a resin such as phenol with a carbon such as expanded graphite, graphite, or Furness Black is used as the material of the anode-side channel substrate 40 instead of the carbon porous material, and that small grooves are formed on the bottom of the anode-side channels 400 along with the direction of flow. This process is also called a striation process in the present document.

When such a mold made by mixing a resin with graphite or Furness Black is used as the material of the anode-side channel substrate 40, pools of water tend to be formed in the channels to block the channels, though such a mold is lower-priced than the carbon porous material. However, by forming such small grooves on the bottom of the anode-side channels 400 as described above, if a pool of water is formed, it flows before growing large and it becomes difficult for the channels to be blocked. It is considered that this is because the area with which a pool of water contacts the bottom of a channel becomes smaller and the force of the channel holding the pool of water becomes weaker.

As a result, the anode-side channel substrate 40 of the present embodiment has effects that it is relatively low-cost and that it restricts occurrences of blockage of the channels.

The sectional shape of the small grooves 402 formed on the bottom of the anode-side channels 400 is not limited in particular.

Figure 13A:
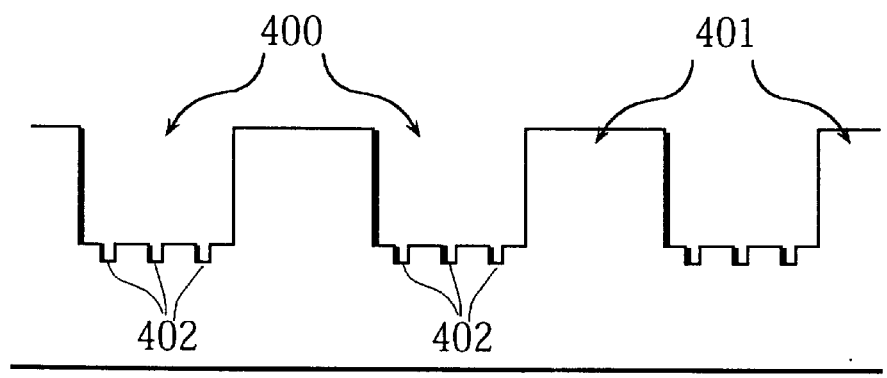
FIGS. 13A, 13B, and 13C show examples of sectional shapes of the small grooves in Embodiment 6.
Figure 13B:
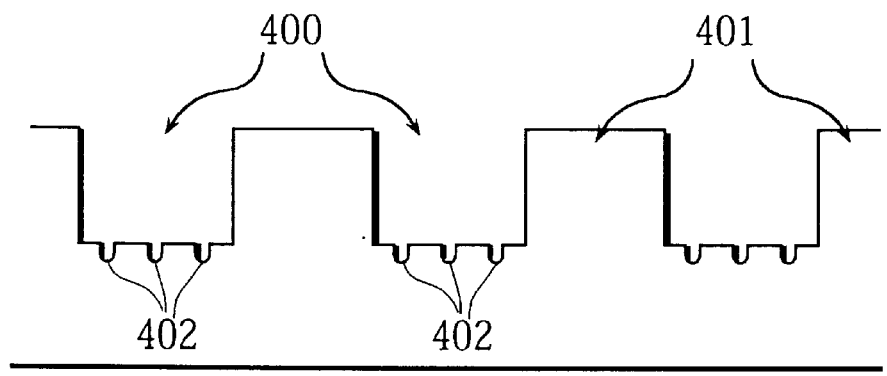
Figure 13C:
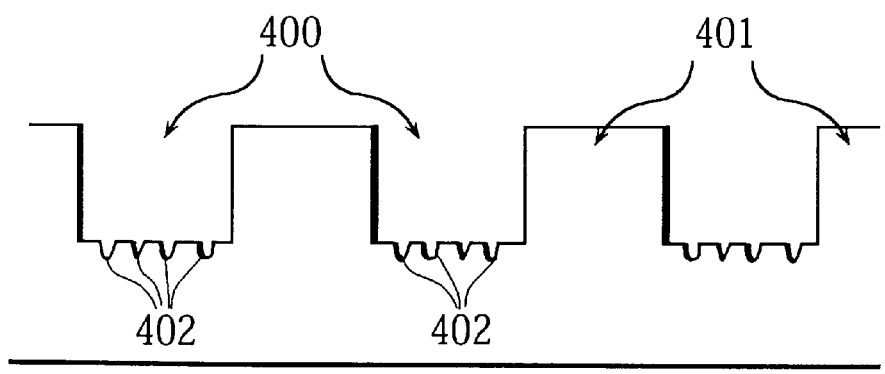

FIGS. 13A–13C show examples of sectional shapes of the small grooves 402. The sectional shape of the small grooves 402 may be: rectangular as shown in FIG. 13A; U-shaped as shown in FIG. 13B; or a mixture of various shapes as shown in FIG. 13C. The interval between the small grooves 402 may be: regular as shown in FIGS. 13A and 13B; or irregular as shown in FIG. 13C.

Forming at least one small groove 402 per channel 400 will be enough to gain the effects.

The preferable width of the small grooves 402 ranges from 5 $\mu$m to 200 $\mu$m. The effect of restricting the occurrence of channel blockage will become smaller if the width is less than 5 $\mu$m or exceeds 200 $\mu$m.

It is preferable that the depth of the small grooves 402 is about the same as the width.

The small grooves 402 with width of 100 $\mu$m or more can be formed easily by forming projections corresponding to the small grooves 402 on the surface of the die for the molding. As for the small grooves 402 with width of less than 100 $\mu$m, the grooves may be cut with needles or the like after the molding. Grooves with irregular shapes as shown in FIG. 13C may be formed by polishing the molded material with polishing paper.

The small grooves 402 formed on the bottom of the anode-side channels 400 generate the same effects if they are applied to the fuel cell of Embodiment 1. In this case, the small grooves 402 may be formed on the bottom of each anode-side channel 400. However, the grooves may only be formed on the bottom of the water supply channels since pools of water hardly form in the other channels.

EMBODIMENT 7

Figure 14:
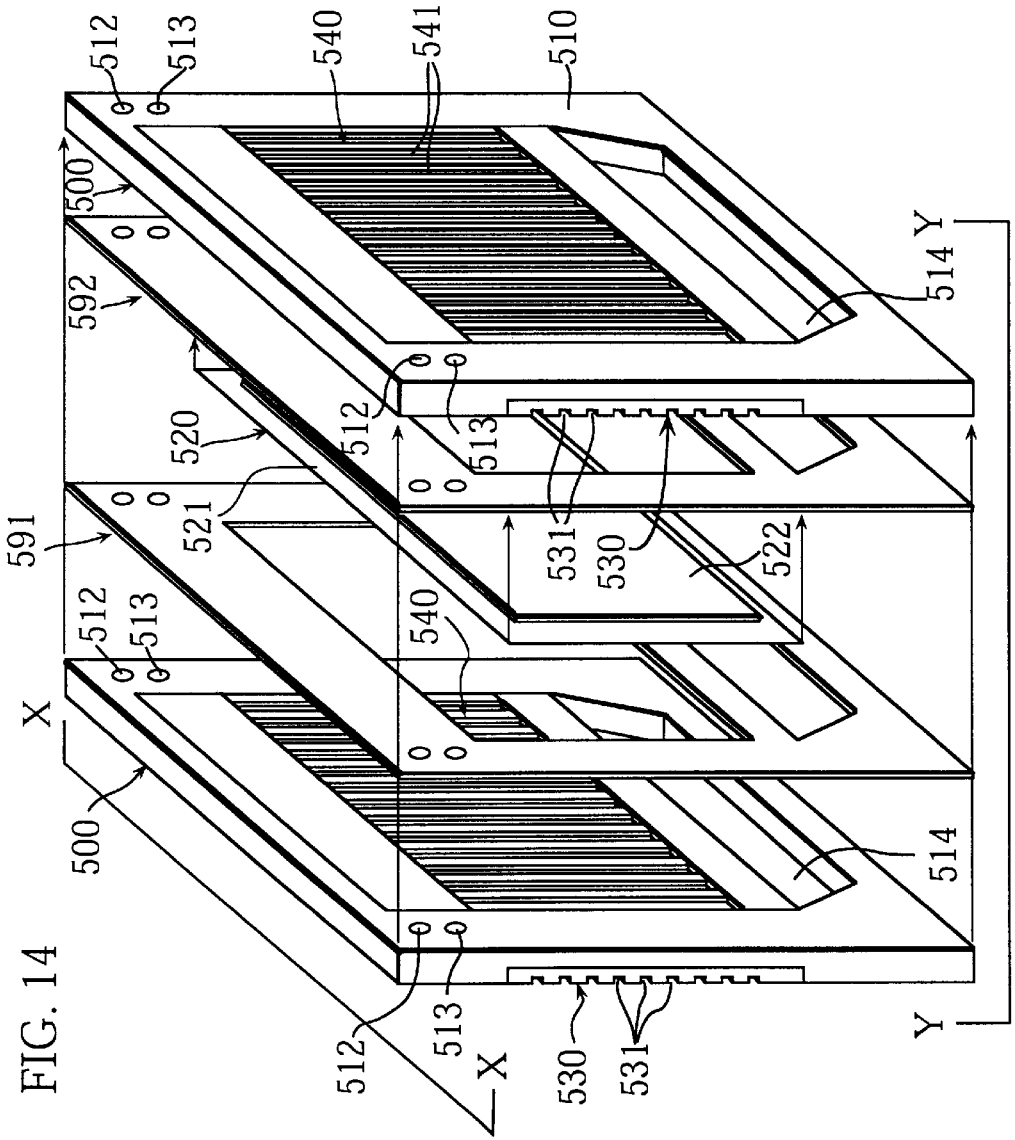
FIG. 14 is an exploded perspective view of the fuel cell in Embodiment 7.

As shown in FIG. 14, the polymer electrolyte fuel cell includes a cell 520 sandwiched by gaskets 591 and 592. The stack is further sandwiched by two composite separators 500, which are further sandwiched by a pair of end plates 601 and 602 (see FIG. 16). The cell 520 is composed of a polymer electrolyte membrane 521, a cathode 522, and an anode 523 (in FIG. 14, the anode 523 is not shown since it is on the back side of the polymer electrolyte membrane 521. See FIG. 18), the polymer electrolyte membrane 521 being sandwiched by the cathode 522 and the anode 523. Each composite separator 500 includes cathode-side channels 531 and anode-side channels 541.

In FIG. 14, only one cell 520 and two composite separators 500 are shown. Although not illustrated, a water-repellent current collector is inserted respectively: between the cathode 522 and the cathode-side channels 531; and between the anode 523 and the anode-side channels 541.

Figure 15:
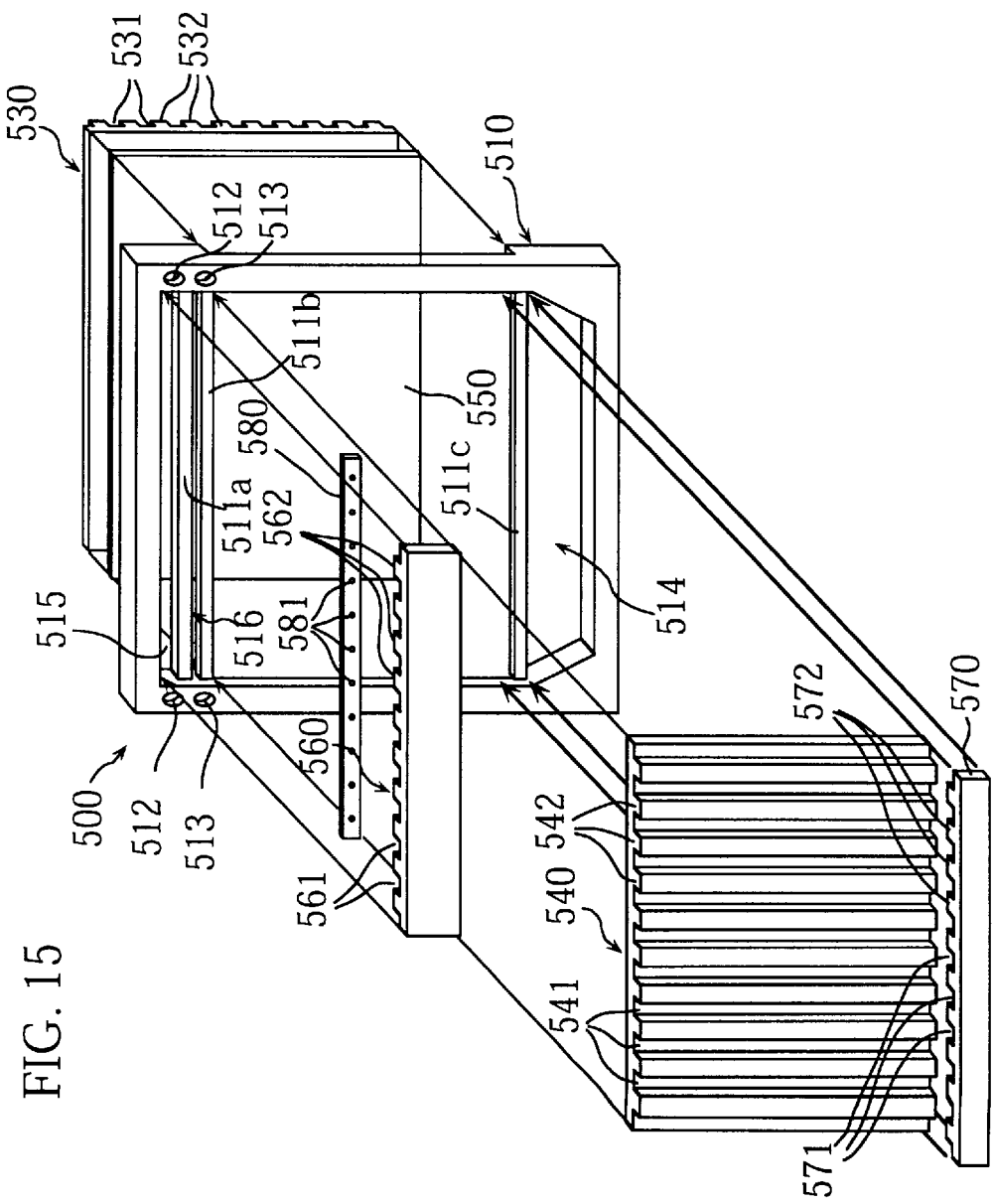
FIG. 15 is an assembly drawing of the composite separator in Embodiment 7.

FIG. 15 is an assembly drawing of the composite separator 500.

As shown in the drawing, components 530 to 570 are fitted in the inner space of a separator frame 510 to form the composite separator 500.

The separator frame 510 is made of plastic or the like. Partitions 511a and 511b are across the upper inner space of the frame 510, and partition 511c is across the lower inner space. On the upper corners of the separator frame 510, manifolds 512 used for supplying hydrogen and manifolds 513 used for supplying water are opened.

There is a slot 515 for hydrogen above the partition 511a, and a slot 516 for water between the partitions 511a and 511b. The slot 515 is connected to the manifold 512 for hydrogen supply, and the slot 516 is connected to the manifold 513 for water supply.

An anode-side channel substrate 540 is fitted in the center of the inner space on one side (in FIG. 15, the front side) of the separator frame 510, and cathode-side channel substrate 530 from the other side (in FIG. 15, the back side), with a partition plate 550 made of hermetical glassy carbon in between. The lower part below the inner space is a manifold 514 used for discharging the gas-liquid mixture.

The cathode-side channel substrate 530 is a plate made of porous carbon on which a plurality of channels 531 and ribs 532 are formed horizontally. The anode-side channel substrate 540 is a plate made of porous carbon on which a plurality of channels 541 and ribs 542 are formed vertically.

In the inner space of the separator frame 510, an inlet channel substrate 560 and an outlet channel substrate 570 are respectively fitted in on and under the anode-side channel substrate 540.

The inlet channel substrate 560 is a rectangular plate made of plastic on which inlet channels 561 and ribs 562 are formed. The inlet channels 561 have the same pitch as the channels 541 of the anode-side channel substrate 540 but are attached in the reversed direction. The outlet channel substrate 570 is a rectangular plate made of the same material as the inlet channel substrate 560, and outlet channels 571 and ribs 572 are formed on the outlet channel substrate 570.

The channels 541, 561, and 571 of the three channel substrates 540, 560, and 570 contact to each other, and allow the gas-liquid mixture to pass through themselves.

A rectangular water distribution plate 580 is attached to the surface of the ribs 562 of the inlet channel substrate 560. The water distribution plate 580 is similar to the water distribution plate of Embodiment 2 and is a partition between the slot 516 and the inlet channels 561. Pores 581 are opened on the water distribution plate 580 so that water is distributed into each channel 561.

Operation of Fuel Cell

Figure 16:
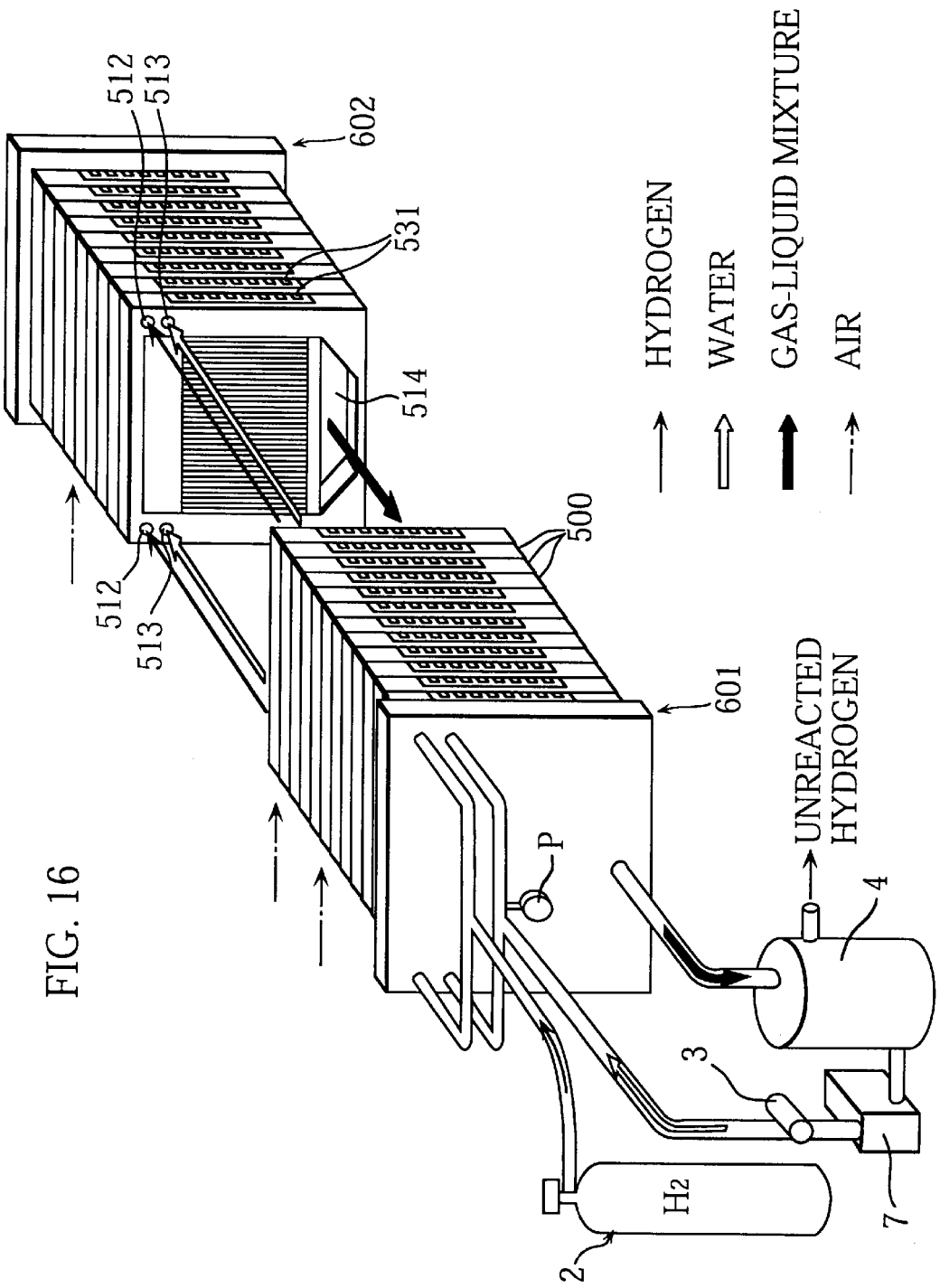
FIG. 16 shows the operation of the fuel cell in Embodiment 7.
Figure 17:
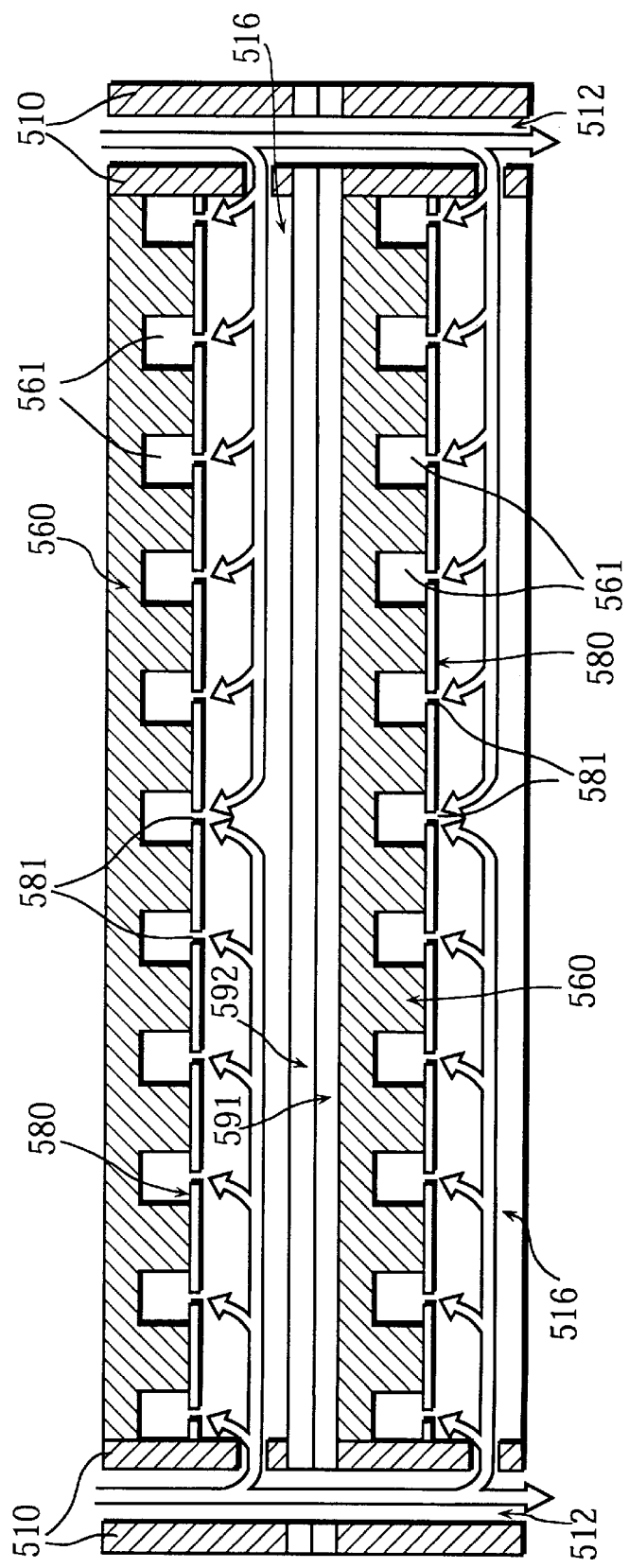
FIG. 17 is a sectional view of FIG. 14 taken along the line X—X.
Figure 18:
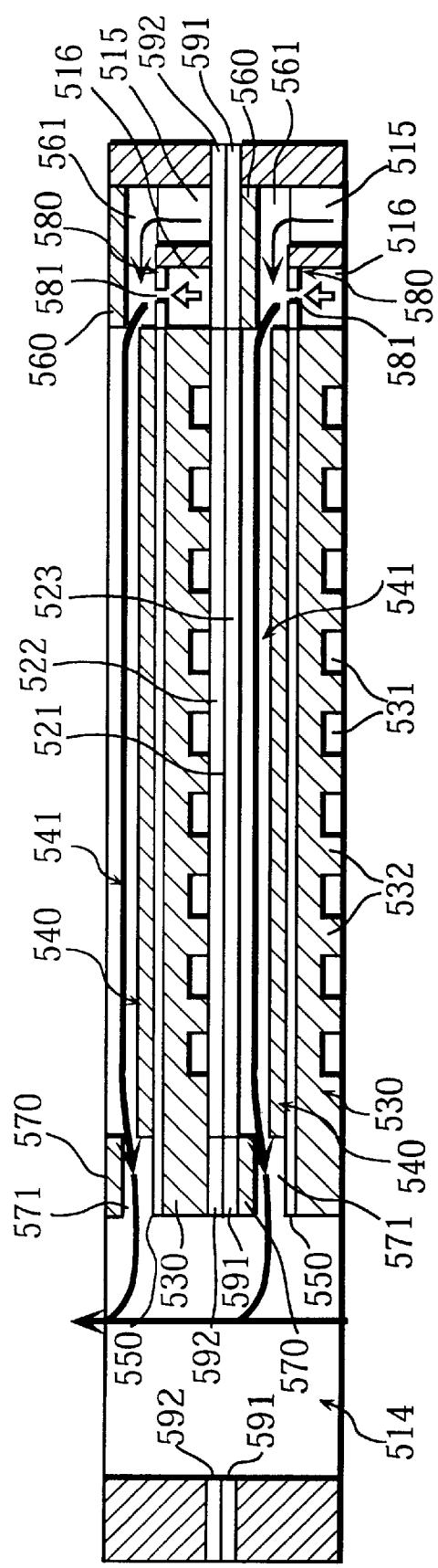
FIG. 18 is a sectional view of FIG. 14 taken along the line Y—Y.

FIG. 16 shows the operation of the above-constructed polymer electrolyte fuel cell. FIG. 17 is a sectional view of FIG. 14 taken along the line X—X. FIG. 18 is a sectional view of FIG. 14 taken along the line Y—Y.

In FIGS. 16–18: hollow arrows indicate flow of water; thin solid line arrows indicate flow of hydrogen; thick solid line arrows indicate flow of the gas-liquid mixture; and break line arrows indicate flow of air.

Hydrogen is supplied from a hydrogen cylinder 2 to the manifolds 512 for hydrogen supply of the fuel cell, then to the slot 515 of each separator, where hydrogen is distributed into the inlet channels 561 and flows downwards.

Water is supplied by activating the water pump 3 from the gas-liquid separation tank 4 to the manifolds 513 for water supply of the fuel cell via the cooler 7, then to the slot 516 of each separator, where the water is distributed into the inlet channels 561 via the pores 581. The water is mixed with hydrogen in each inlet channel 561 to generate the gas-liquid mixture.

The gas-liquid mixture generated in the inlet channels 561 flows through the channels 541 supplying hydrogen to the anode 523, humidifies the polymer electrolyte membrane 521, passes through the channels 571, and is discharged from the fuel cell through the manifolds 514. The gas-liquid mixture also functions as a cooling medium for cooling the fuel cell.

The amount of water supplied to the fuel cell is adjusted by controlling the output of the pump 3 so that a water pressure gauge (represented as "P" in FIG. 16) indicates a certain value while the water pressure applied to the water distribution plate 580 is measured by the water pressure gauge.

At least a certain amount of water enough to hold the fuel cell at a certain operation temperature (around 80° C.) is required. However, it is preferable to set the amount of water to as small a value as possible to smoothly supply hydrogen to the anode 523 and to reduce the size of the pump 3 and other units.

The gas-liquid mixture discharged from the fuel cell flows into the gas-liquid separation tank 4, where the mixture is separated into the unreacted hydrogen and water. The separated water is recycled, and the unreacted hydrogen is burned in a burner (not illustrated). See FIG. 16.

Air is supplied from a fan (not illustrated) to the fuel cell through an air supply manifold (not illustrated). Air then passes through the channels 531 supplying oxygen to the cathode 522, and is discharged from the fuel cell. It is possible to operate the fuel cell in the same way by using a hydrogen-rich reformed gas instead of the hydrogen gas.

Supplying Water to Inlet Channels

The quality and shape of the water distribution substrate 580 and the diameter of the pores 581 have been described earlier in Embodiment 1.

The value P used for obtaining a proper amount of water depends on the diameter of the pores 581. Generally, the value P is set to a range of 10 mm $H_2O$ to 100,000 mm $H_2O$, more preferably to 100 mm $H_2O$ to 800 mm $H_2O$.

Meanwhile, Japanese Patent Application No. 7-296414 filed earlier in Japan by an inventor of the present application and others discloses a polymer electrolyte fuel cell in which water and hydrogen are sent from water channels to the inlet of the anode-side channels through porous substrate (porous carbon plate) to generate the gas-liquid mixture. The pores formed in the porous substrate are different in size or shape, while the pores 581 formed in the water distribution substrate 580 have the same size and shape.

In case of the porous substrate, water tends to flow out through the pores even if the slots for water are not given much water pressure. On the other hand, in case of the water distribution substrate 580, water does not flow out through of the pores 581 unless the water slots are given a certain water pressure.

Accordingly, when a small amount of water with low-pressure is supplied, the water distribution substrate 580 distributes the water into inlet channels more equally than the porous substrate (See the hollow arrows in FIG. 17).

In case of the porous substrate, water flowing out from the pores tends to join each other to form large drops of water at the surface of the outlet side of the porous substrate since the porous substrate have a large number of minute pores with narrow spacing between pores. On the other hand, water flowing out from the pores of the water distribution substrate 580 does not join each other due to wide spacing between pores. Therefore, the water distribution substrate 580 can generate a gas-liquid mixture well separately.

Accordingly, it is possible to generate a gas-liquid mixture uniformly for each inlet channel 561 by using the water distribution substrate 580 instead of the porous substrate.

In the present embodiment, as shown in FIG. 18, the pores 581 as inlets for water are located downstream of inlets for hydrogen through which hydrogen flows from slots 515 to inlet channels 561. In such a construction, the inlet channels 561 do not tend to hold air bubbles in themselves. This prevents the inlet channels 561 from being blocked by air bubbles.

Variations of Embodiments 1–7 and Others

In Embodiment 1, the pores 12a are formed on the gas distribution plate 12 to correspond to all of the channels 400. However, to obtain substantially the same effects, the pores 12a may be formed only to correspond to the channels not corresponding to the pores 11a of the water distribution plate 11.

In Embodiment 1, the anode-side channel substrate is made of a carbon porous material. However, to perform in the same way, a molded mixture of a resin such as phenol with a carbon such as expanded graphite, graphite, or Furness Black may be used instead of the carbon porous material as the material of the anode-side channel substrate, and that water-holding layers are formed on the substrate or striation is performed on the substrate.

In Embodiment 7, the water distribution plate placed upstream of the anode-side channel substrate is used to distribute water. However, the water distribution plate may be used in the same way to distribute water even if the fuel gas channels have a porous structure such as the corrugated structure disclosed in the embodiment of Japanese Laid-Open Patent Application No. 4-144063 or a structure of a foaming metal.

In Embodiments 1–6, the anode-side channel substrate 40 is a carbon plate formed in one piece including the center part 40a, the upstream part 40b, and the downstream part 40c. However, the three parts may be formed separately.

When the three parts are formed separately as described above, it is preferable that the contact angle of water decreases in the order of 40c, 40b, and 40a, or the contact angle is the same for each part so that water does not stagnate at each boundary between the parts 40a and 40b and between the parts 40b and 40c.

In Embodiments 1–6, the spongy material 14 is fitted in the slot 124 of the frame 10 so that the spongy material 14 contacts the downstream part 40c of the anode-side channel substrate 40. However, a spongy material may be fitted in the end of the downstream part 40c so that the spongy material sucks water and the sucked water drops onto the slot 124 from the edge of the spongy material to be discharged from the fuel cell.

The water-holding layer explained in Embodiment 5 and the small groove explained in Embodiment 6 can also be applied to the fuel cell of Embodiment 7, providing the same effects.

In such polymer electrolyte fuel cells of Embodiments 1–7 in which water is supplied to the anode-side channels, water tends to stagnate in the anode-side channels. To solve the problem and prevent blockage of fuel gas flow to improve the characteristics of generating electric power, the anode-side channels are provided with: means for selectively exhausting gas; means for sucking water; water-holding layers; or small grooves. However, there is a possibility that the cathode-side gas channels are also blocked by water generated by reaction or water moved from the anode side. As a result, the cathode-side channels may also be provided with: means for selectively exhausting gas; means for sucking water; water-holding layers; or small grooves to have the effects of preventing blockage of fuel gas flow.

In Embodiments 1 to 6, the cathode-side channel substrate 30 and the anode-side channel substrate 40 are formed separately. However, a close-grained bipolar plate formed by cutting or molding a carbon plate may be used to perform the same.

In Embodiments 1 to 7, the parallel anode-side channels formed on the anode-side channel substrate are rectangular both in a top plan view and a sectional view. However, they may be sphenic or meandering in a top plan view, and trapeziform, triangle, or U-shaped in sectional view. Also, the anode-side channels may not necessarily be formed in parallel to each other.

EXPERIMENTS

Experiment 1

An experiment was carried out as follows to study the relationships between the diameter of the pores formed on the water distribution plate, water pressure, and flow rate.

Figure 19:
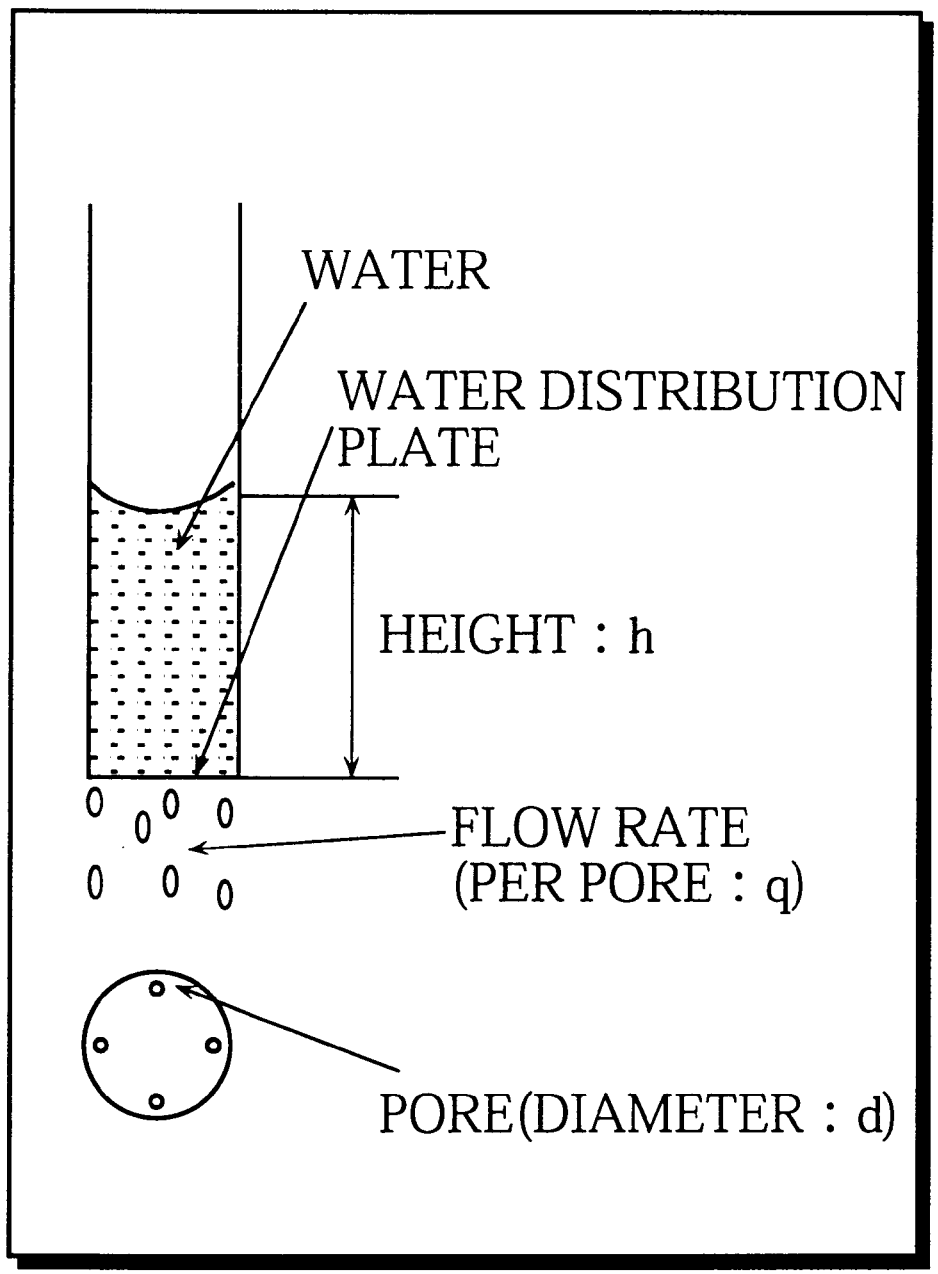
FIG. 19 shows Experiment 1.

As shown in FIG. 19, a round, 125 $\mu$m-thick water distribution plate made of SUS316 is attached to the bottom of a cylindrical pipe, where the plate has a certain number of (1–8) pores whose diameter is represented as a certain value d (0.3 mm, 0.6 mm, or 1.2 mm). Water is poured into the pipe to a certain height h, when water pressure P applied to the water distribution plate is represented as h mm $H_2O$. The flow rate q (cc/min) of water flowing down per pore is then measured.

Figure 20:
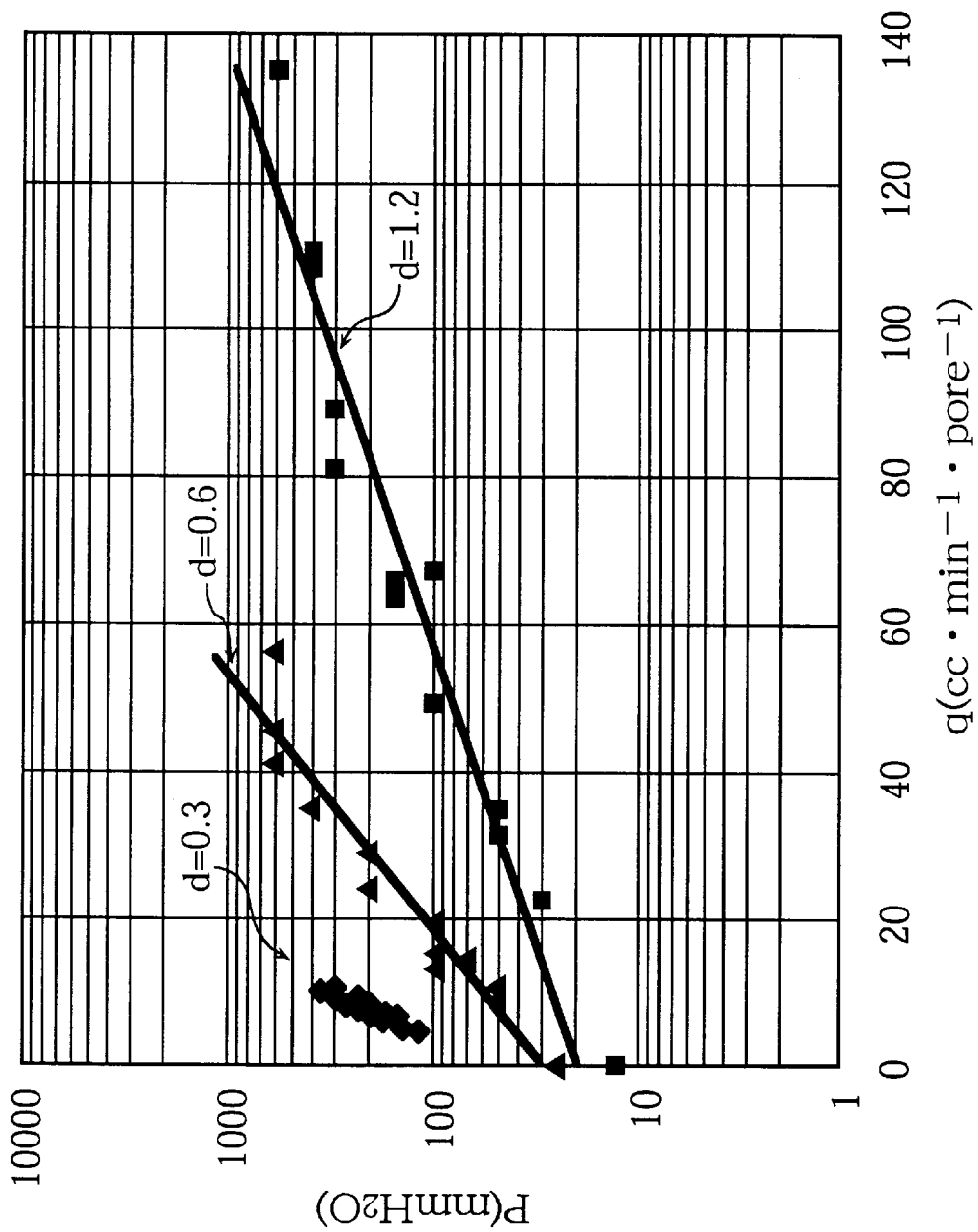
FIG. 20 is a plot of the measurement results of Experiment 1.

FIG. 20 is a plot of the measurement results. The drawing shows relationships between the flow rate q (cc/min) per pore and the water pressure P (mm $H_2O$) for each of d=0.3 mm, 0.6 mm, and 1.2 mm, where the water pressure P is represented in logarithmic scale. In FIG. 20, sign ♦ represents a measurement value for d=0.3 mm, sign ▲ a measurement value for d=0.6 mm, and sign ■ a measurement value for d=1.2 mm. The plots for the above three cases are each represented as a linear line.

It is derived from this plot that the above relationships are represented as $$\ln P = A*q + \ln P0 \tag{1}$$

in common to the cases of d=0.3 mm, 0.6 mm, and 1.2 mm, regardless of the number of pores opened in the water distribution substrate, where A represents a slant of the graph, and P0 a value P when q=0.

Figure 21:
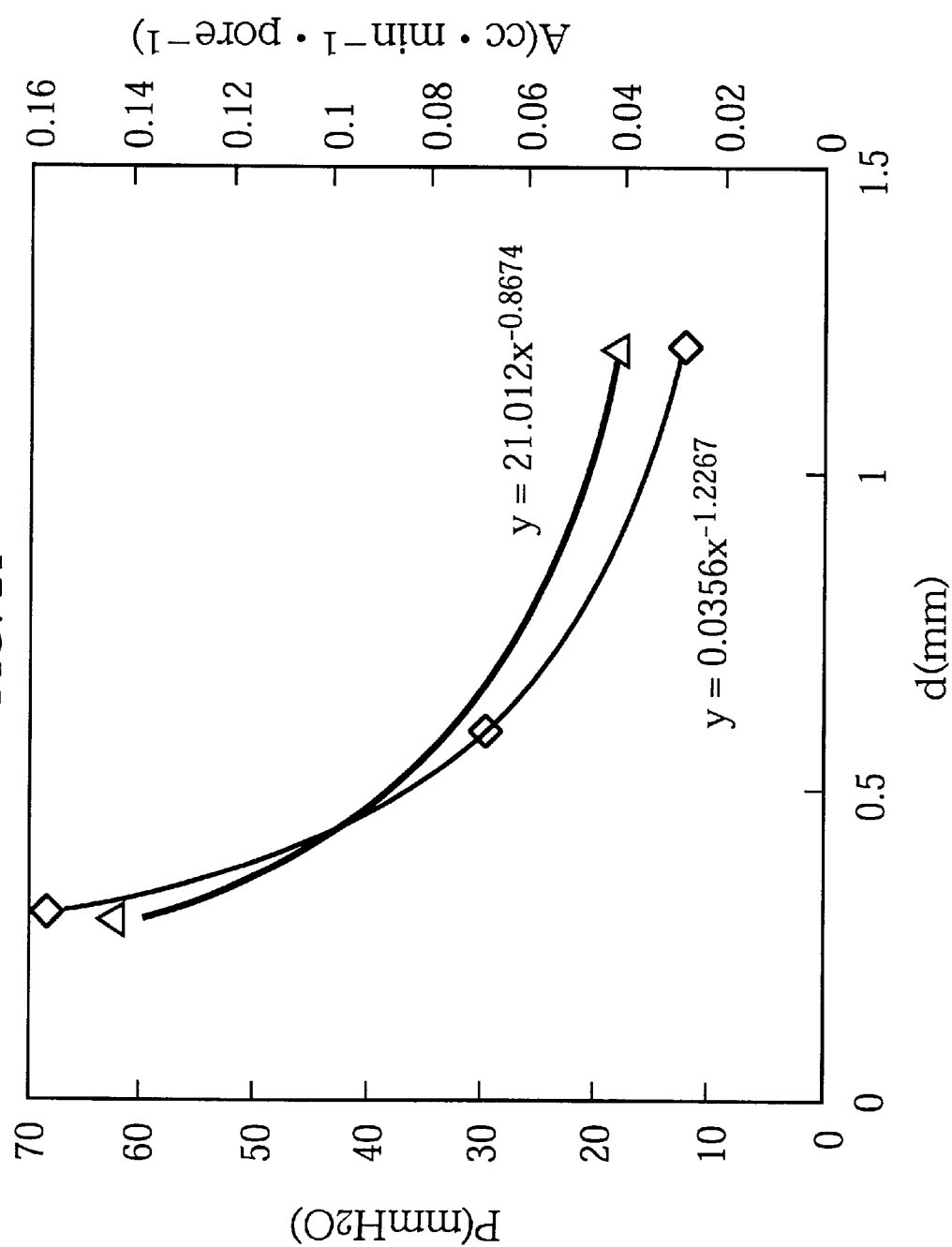
FIG. 21 is a plot made from the measurement results of Experiment 1.

FIG. 21 is a plot of diameter d versus constant P0 and a plot of diameter d versus constant A. In FIG. 21, a sign ◇ represents a point of diameter d versus constant P0 and a sign △ represents a point of diameter d versus constant A, where d=0.3 mm, 0.6 mm, or 1.2 mm.

The curve connecting the ◇ points is represented as $Y=0.0356X^{-1.2267}$, and the curve connecting the △ points is represented as $Y=21.012X^{-0.8674}$. It is estimated from these plots that the relationship between diameter d and constant A is represented as $$A = 0.0356 d^{-1.2267} \tag{2}$$

and the relationship between diameter d and constant P0 is represented as $$P0 = 21.012 d^{-0.8674} \tag{3}$$

Relationships between the flow rate q and the water pressure P were then obtained based on the above formulas (1) to (3) presuming that the pressure loss of the water passing through a pore is proportional to the length of the pore (i.e., the thickness of the water distribution plate) for each case in which d=0.08 mm, 0.2 mm, 0.3 mm, 0.4 mm, 0.5 mm, or 0.6 mm and the thickness of the water distribution plate is 0.15 mm.

Figure 22:
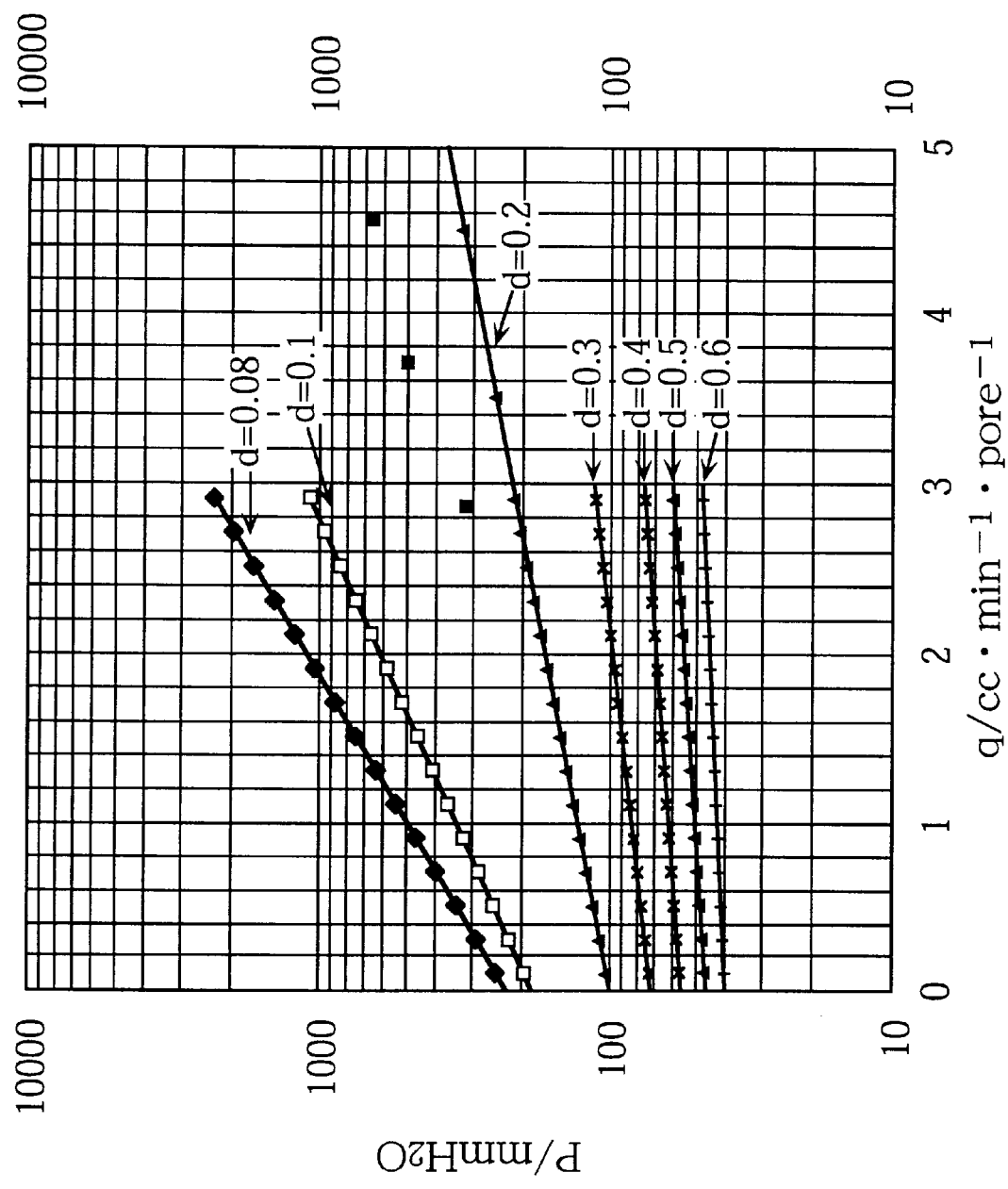
FIG. 22 is a plot made from the measurement results of Experiment 1.

FIG. 22 shows the relationships between the flow rate q and the water pressure P which are indicated as linear lines.

In FIG. 22, signs ■ represent values of flow rate q measured with the polymer electrolyte fuel cell of Embodiment 7 corresponding to water pressure P=300 mm $H_2O$, 500 mm $H_2O$, and 700 mm $H_2O$. It is noticed that the linear line connecting the ■ points is similar to the linear line for diameter d=0.2 mm in the drawing.

By using the above linear line for diameter d=0.2 mm shown in FIG. 22, it is possible to determine a water pressure P value corresponding to a desired flow rate q value for the polymer electrolyte fuel cell of Embodiment 7. For example, it is found that to set the flow rate q per pore to 3 cc/min, water pressure P should be set to around 200 mm $H_2O$.

The graph for diameter d=0.2 mm also indicates that the water pressure P corresponding to the flow rate 0 is around 100 mm $H_2O$. It is derived from this that in the polymer electrolyte fuel cell of Embodiment 7, water is not discharged from pores until water fills the slot 121 or 516 and the water pressure P has reached around 100 mm $H_2O$. This indicates that until water extends into the center part of the slot, water is not discharged from pores at the edges of the water distribution plate, and that water is discharged from pores at the center of the water distribution plate, as well as from those at the edges.

This experiment results similarly apply to the fuel cells of Embodiments 1 to 6.

Experiment 2

How water is discharged and distributed by the water distribution plate of Embodiment 7 was observed. In this observation, the water distribution plates processed as follows were used.

(a) The surface of the outlet side of the water distribution plate is scraped with sandpaper so that the contact angle of the water to the surface is larger at the outlet side than at the inlet side.

(b) The surface of the inlet side of the water distribution plate is scraped with sandpaper so that the contact angle of the water to the surface is larger at the inlet side than at the outlet side.

(c) A porous carbon plate is used instead of the water distribution plate.

The contact angle of ion-exchanged water to the water distribution plate (SUS304) at the peripheral of a pore was measured (in the air at room temperatures). The measured contact angle was 91° before the surface was scraped with sandpaper, 70° before scraped with sandpaper #320, and 64° before scraped with sandpaper #600.

Figure 23:
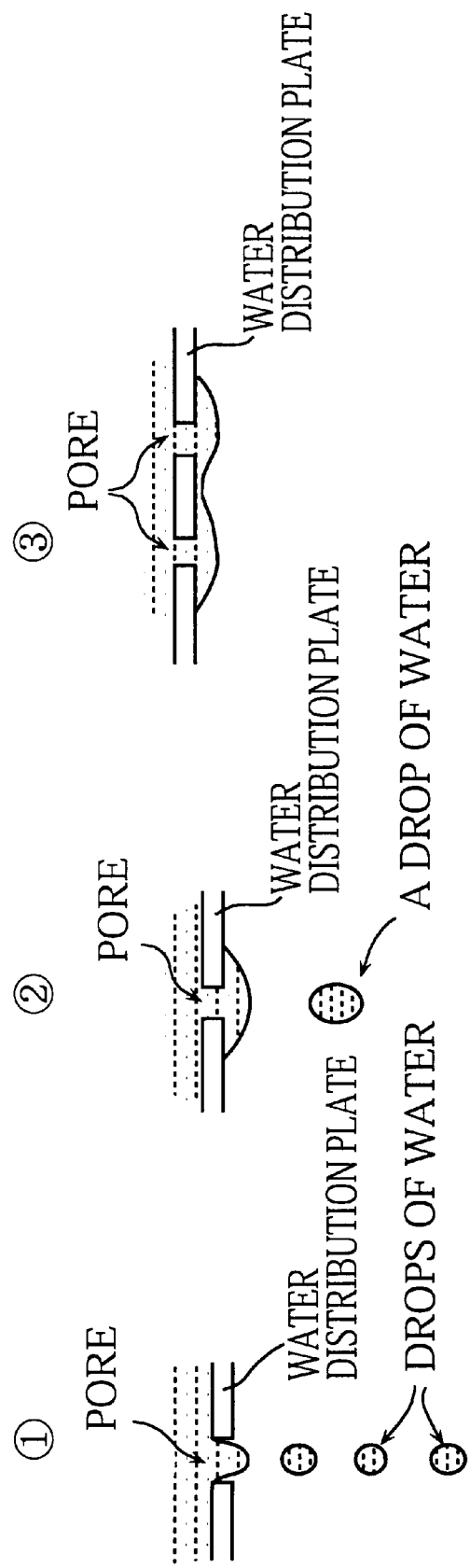
FIG. 23 shows Experiment 2.

FIG. 23 shows how water is discharged from the pores.

In the drawing, ① shows that water is discharged as droplets from the pore, ② shows water attached to peripheral of the pore on the outlet side, and ③ shows that the water attached to peripheral of one pore is connected to the water attached to the adjacent pore on the outlet side.

In case of the above (a), the state ① shown in FIG. 23 was mainly observed, indicating that water was dispersed in a good condition.

In case of the above (b), all of the states ① to ③ were observed, indicating that water was dispersed a little unequally.

In case of the above (c), states ② and ③ were observed, indicating that water was dispersed unequally.

From these results, it is understood that it is effective at allowing water to disperse in a good condition to set the contact angle of the water to the surface smaller at the outlet side than at the inlet side.

In the present experiment, sandpaper is used to adjust the contact angle of the water at the outlet side to be smaller than at the inlet side. However, the same effect can be obtained by applying or bonding a membrane made of a material with small contact angle to water to the surface of the water distribution plate.

Experiment 3

A fuel cell A1 to meet the following specifications was produced based on Embodiment 7.

Electrode area: 100 $cm^2$.

Polymer electrolyte membrane: 0.13 mm-thick Nafion® 115 (made by Du Pont Co., U.S.A.).

Anode and Cathode: platinum-holding carbon paper (amount of held platinum is 0.7 $mg/cm^2$).

Water distribution plate: 0.15 mm-thick SUS316 plate with 0.2 mm-diameter pores opened for corresponding channels.

A fuel cell X was also produced for comparison with the fuel cell A1. The fuel cell X is the same as the fuel cell A1 except that it uses a porous carbon plate instead of the thin plate with pores.

Cell voltages at each of the fuel cells A1 and X were measured for various fuel utilizations Uf.

Figure 24:
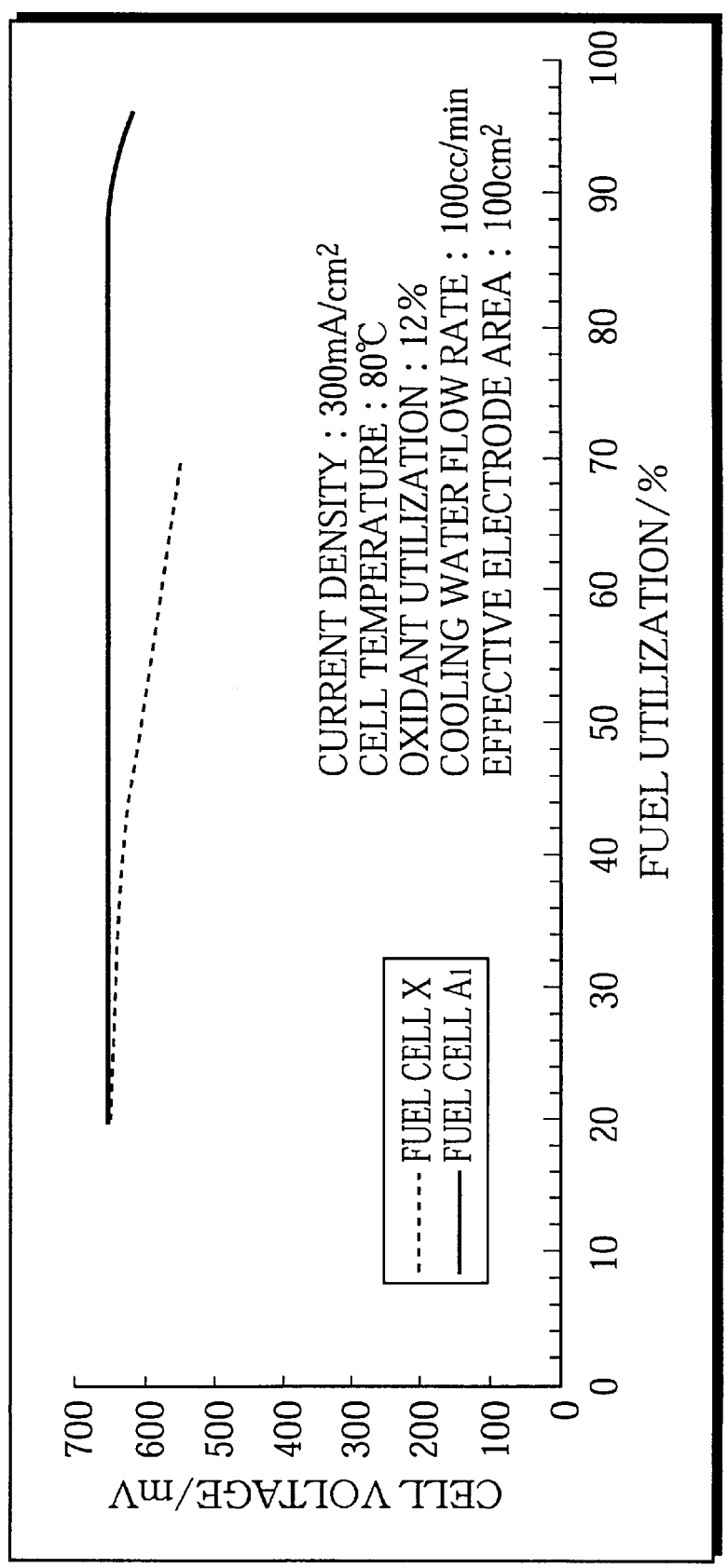
FIG. 24 is a plot of the measurement results of Experiment 3.

Table 1 and FIG. 24 show the measurement results that indicate relationships between the fuel utilization and the cell voltage.

TABLE 1

| FUEL UTILIZATION | FUEL CELL A1 | FUEL CELL X |
| --- | --- | --- |
| 20% | 650 mV | 645 mV |
| 40% | 650 | 630 |
| 50% | 645 | 600 |
| 70% | 644 | 540 |
| 80% | 643 | |
| 90% | 640 | |
| 96% | 610 | |

As apparent from FIG. 24, the fuel cell A1 of Embodiment 7 shows stable cell performance even when the cell operates at higher fuel utilizations than the fuel cell X.

Experiment 4

A fuel cell B1 to meet the following specifications was produced based on Embodiment 2.

Electrode area: 100 $cm^2$

Polymer electrolyte membrane: perfluorocarbon sulfonic acid membrane

Anode: carbon supported platinum-ruthenium

Cathode: carbon supported platinum

Number of stacked cells: 16

Also, a fuel cell A2 (a fuel cell without means for selectively exhausting gas) to meet these specifications was produced based on Embodiment 7.

The fuel cells B1 and A2 were operated in the following conditions while the cell voltage (mV) was measured over time.

Current density: 0.5 $A/cm^2$

Fuel utilization: 70%

Oxidant utilization: 30%

Fuel gas: $H_2/N_2$ (35/65 by volume)

Oxidant gas: air

Figure 25:
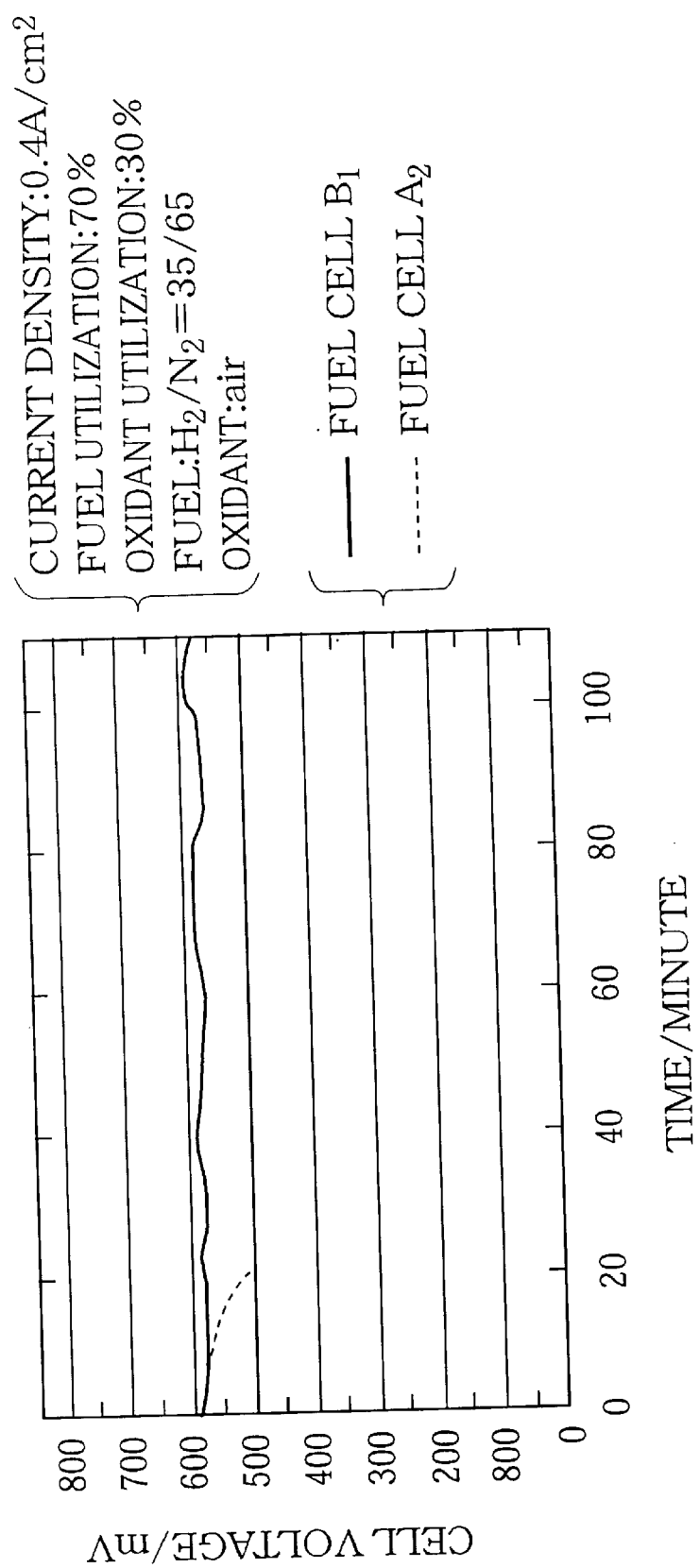
FIG. 25 is a plot of the measurement results of Experiment 4.

FIG. 25 is a plot of the results of this experiment. In the drawing, the horizontal axis represents time (minutes), and the vertical axis represents the cell voltage (mean value of all the cells) (mV).

As understood from FIG. 25, the cell voltage of fuel cell A2 decreases over time, with only 20 minutes of stable operation. In contrast, fuel cell B1 generates electric power in a stable manner for a long time.

The above result supports the fact that gas flow is more secured at the anode-side channels of fuel cell B1 than fuel cell A2 during operation since the fuel cell B1 is provided with the means for selectively exhausting gas.

Experiment 5

A fuel cell C1 to meet the following specifications was produced based on Embodiment 1.

Electrode area: 100 $cm^2$

Polymer electrolyte membrane: perfluorocarbon sulfonic acid membrane

Anode: carbon supported platinum-ruthenium paper

Cathode: carbon supported platinum paper

Water distribution plate: 0.15 mm-thick SUS316 plate with 0.2 mm-diameter pores opened Number of stacked cells: 16

A fuel cell B2 to meet these specifications was also produced based on Embodiment 2.

A fuel cell A3 to meet these specifications was also produced based on Embodiment 7.

The fuel cells C1, B2, and A3 were operated in the following conditions while the cell voltage (mV) was measured, where the amount of provided cooling water was variously changed.

Current density: 0.5 $A/cm^2$

Fuel gas: $H_2/N_2$ (36/64 by volume)

Oxidant gas: air

Fuel utilization: 60%

Oxidant utilization: 15%

Figure 26:
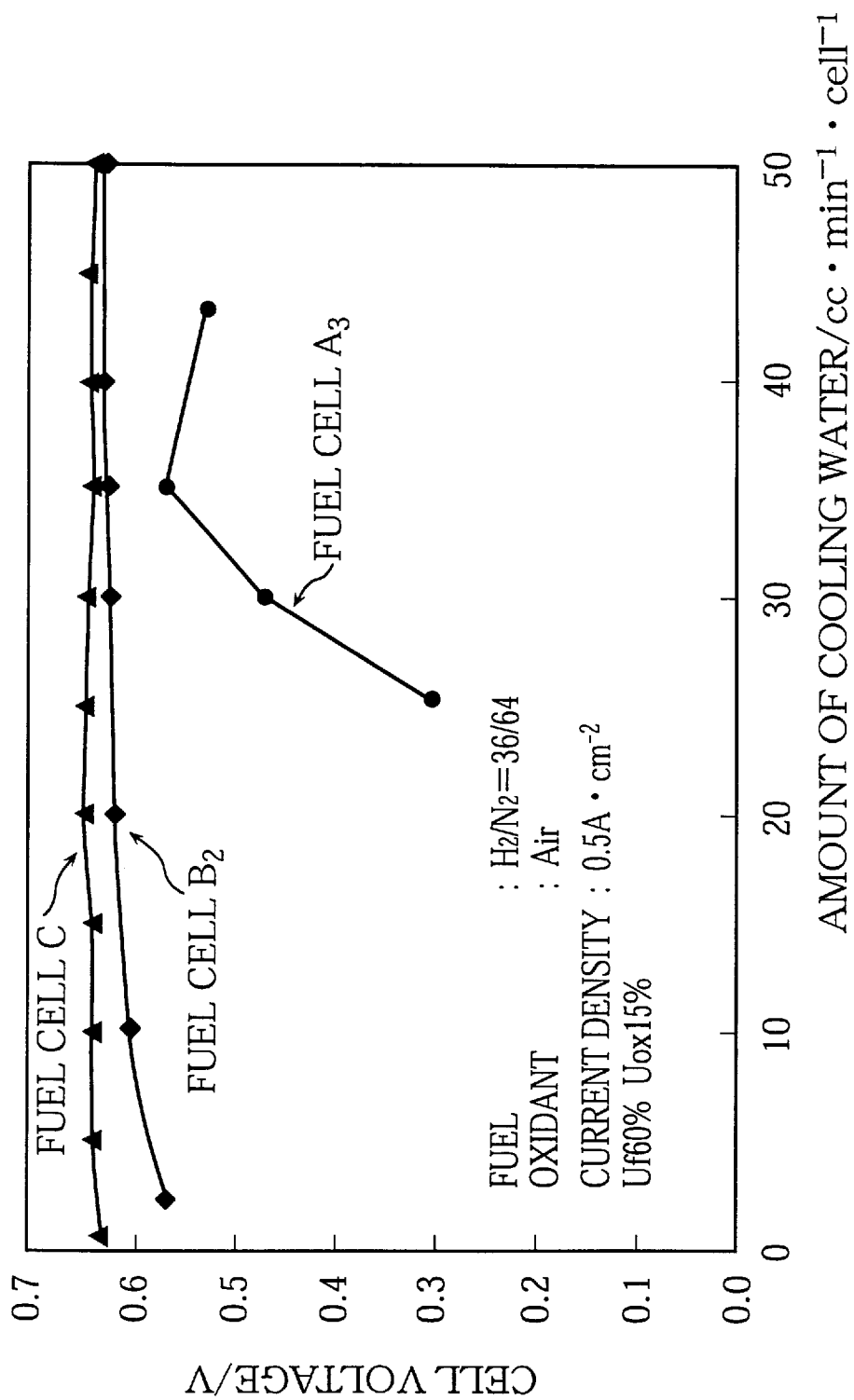
FIG. 26 is a plot of the measurement results of Experiment 5.

FIG. 26 is a plot of the results of this experiment, showing the relationships between the amount of cooling water per cell unit and the cell voltage (mV). The cell voltage is the mean value of all the cells.

As understood from FIG. 26, the cell voltage of fuel cells C1 and B2 is higher than that of fuel cell A3.

This shows that fuel cells, such as C1 and B2, being provided with means for selectively exhausting gas, compared with fuel cells without this means such as fuel cell A3, prevents the fuel gas from being blocked in the channels through which the gas-liquid mixture flows, allowing the fuel gas to be effectively supplied to the whole area of the anode.

It is also observed that the cell voltage of fuel cell B2 decreases as the amount of the cooling water becomes small. In contrast, the cell voltage of fuel cell C1 does not decrease if the amount of the cooling water becomes small, the cell voltage being as high as 0.6 V or more when the amount of the cooling water is decreased to as small as 1 $cc*min^{-1}*cell^{-1}$.

The reason for the above is considered as follows. In fuel cell B2 with a larger number of pores opened on the water distribution plate, water does not flows out equally from each pore when the amount of the cooling water is small, moisture in the polymer electrolyte membrane being not held partially. On the other hand, in fuel cell C1, with a smaller number of pores opened on the water distribution plate, water flows out equally from each pore when the amount of the cooling water is small, moisture in the polymer electrolyte membrane being held entirely.

Experiment 6

A fuel cell Y was also produced for comparison with the fuel cell C1 produced for the Experiment 5. In fuel cell Y, only water is supplied to the water supply channels, and only fuel gas is supplied to the other channels.

The fuel cell Y has the same construction as the fuel cell C1 except that pores are opened on the gas distribution plate to correspond to the channels other than the water supply channels, and pores of a larger size are opened on the water distribution plate to correspond to the water supply channels.

The cell voltage (mV) of the fuel cells C1 and Y was measured by changing the fuel utilization, under the same conditions as Experiment 5.

Figure 27:
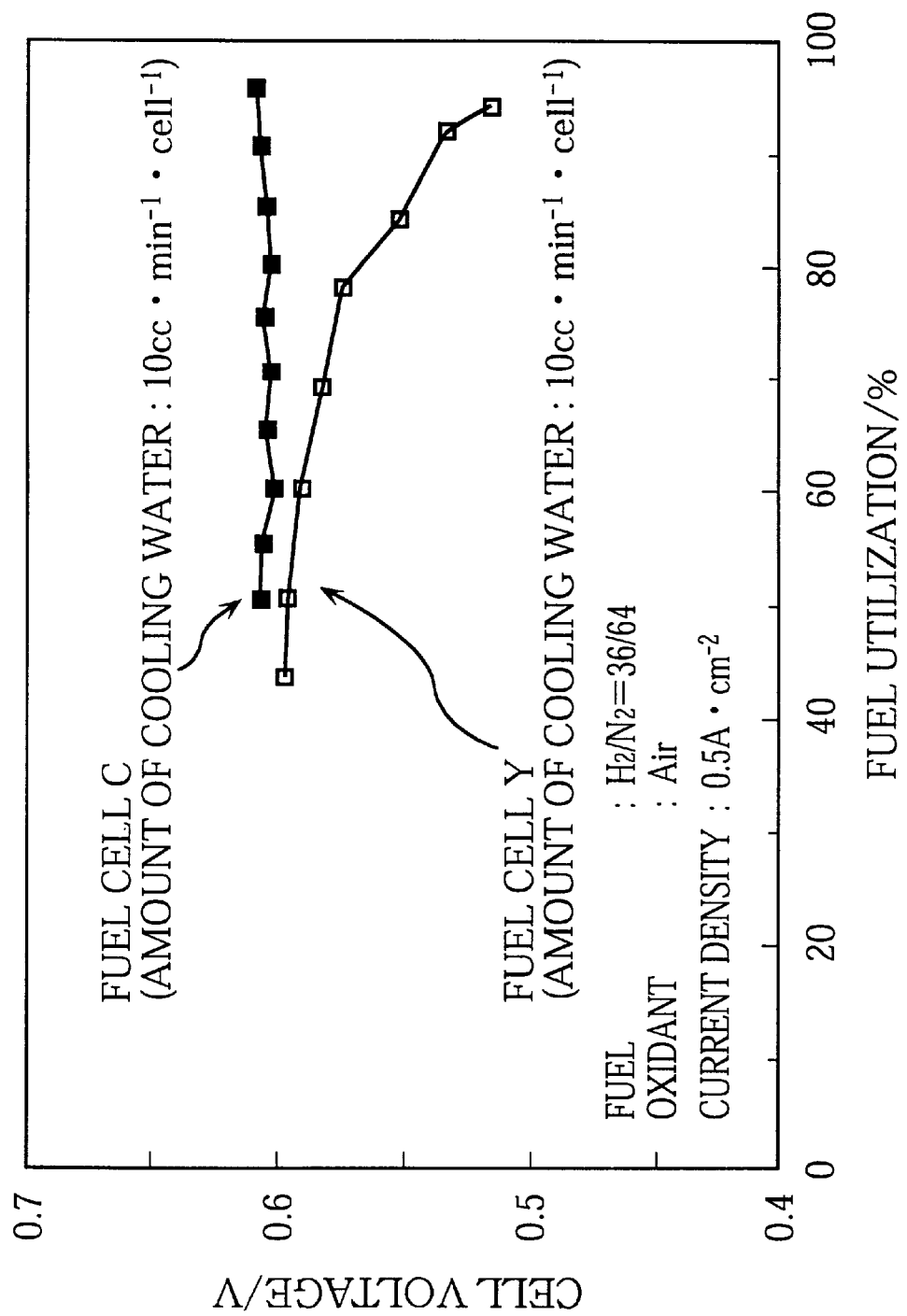
FIG. 27 is a plot of the measurement results of Experiment 6.

FIG. 27 shows that the cell voltage of the fuel cell C1 is higher than the comparative fuel cell Y as a whole. The tendency is noticeable when the fuel utilization is high.

The reason for this is considered as follows. In the comparative fuel cell Y, only water is supplied to the water supply channels, and it is difficult for the fuel gas to be supplied to the parts of the anode facing the water supply channels. On the other hand, in the fuel cell C1, the fuel gas is supplied to the whole area of the anode.

Experiment 7

A fuel cell D was produced based on Embodiment 6. The anode-side channels were first formed by molding a mixture of Furness Black and a phenol resin. The striation process was then performed to form small grooves on the bottom of the anode-side channels by scraping the bottom surface by sand paper.

A fuel cell Z was also produced for comparison with the fuel cell D. The fuel cell D is the same as the fuel cell Z except that the striation process has not been performed.

Amount of cooling water vs. cell voltage and current density vs. cell voltage were measured for each of the fuel cells D and Z.

The cell voltage (mV) of each of the fuel cells D and Z was measured while they were operating with various amounts of water.

Also, the cell voltage (mV) of each of the fuel cells D and Z was measured while they were operating with various current densities.

The fuel cells were operated in the following conditions.

Fuel gas: $H_2$

Oxidant gas: air

Fuel utilization: 50%

Oxidant utilization: 20%

Cell temperature (center): approx. 70° C.

Figure 28A:
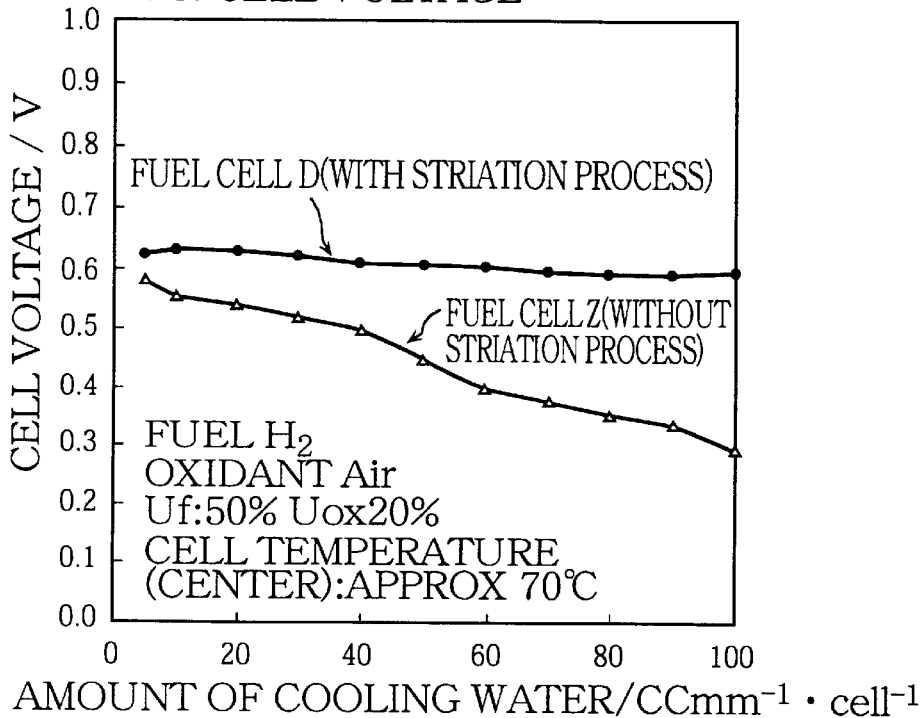
FIGS. 28A and 28B are plots of the measurement results of Experiment 7.

FIG. 28A is a plot of the measurement results of amount of cooling water vs. cell voltage.

It is understood from this drawing that in the fuel cell Z, the cell voltage noticeably decreases as the amount of cooling water increases, and that in the fuel cell D, the cell voltage remains almost the same if the amount of cooling water increases.

The above results are interpreted as follows. In the fuel cell Z, the molded anode-side channel plate without small grooves on the bottom surface blocks water as the amount of cooling water increases. When this happens, the flow rate of the fuel gas decreases. On the other hand, in the fuel cell D, the molded anode-side channel plate with small grooves on the bottom surface hardly blocks water if the amount of cooling water increases. This ensures the flow rate of the fuel gas.

Figure 28B:
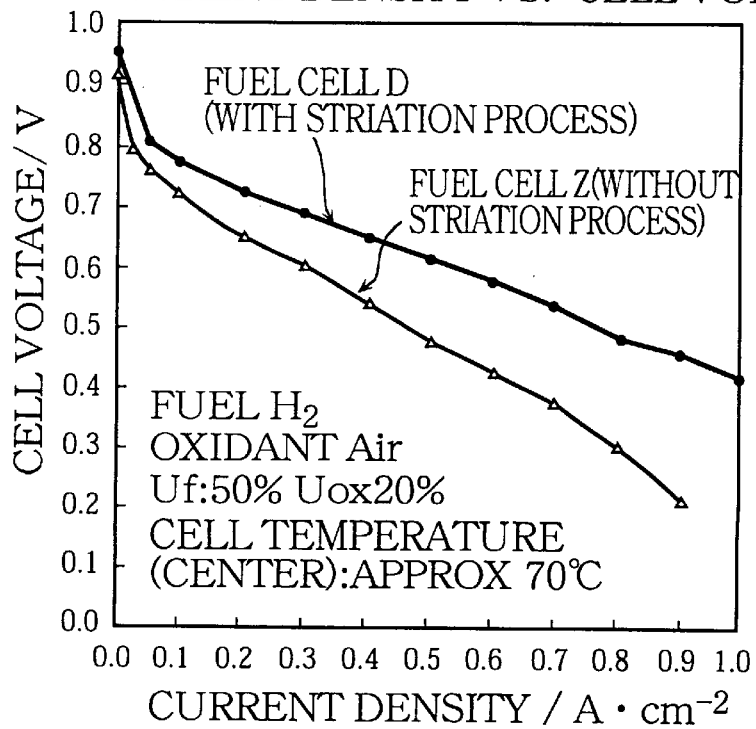

FIG. 28B is a plot of the measurement results of current density vs. cell voltage.

It is understood from this drawing that the cell voltage decreases as the current density increases in both fuel cells D and Z though the decrease ratio of the fuel cell D is smaller than the fuel cell Z.

The above results are interpreted as follows. In the fuel cell Z without the striation process, water blocked in the channels causes the flow rate of fuel gas to decrease, resulting in reduction of the cell voltage. The results show that the decrease in the cell voltage is affected by the current density. That is, the larger the current density is, the lower the cell voltage is.

Experiment 8

A fuel cell E to meet the following specifications was produced based on Embodiment 3.

Electrode area: 100 cm$^2$

Polymer electrolyte membrane: perfluorocarbon sulfonic acid membrane

Anode: carbon supported platinum-ruthenium

Cathode: carbon supported platinum

Number of stacked cells: 52

Spongy material for the drain slots: nonwoven of polyester/rayon (30/70), the edge of the nonwoven being protruded from the manifold 113

A fuel cell C2 to meet these specifications except that the spongy material is not set in the drain slots was also produced based on Embodiment 1.

The fuel cells C2 and E were operated in the following conditions while the mean cell voltage was measured over time.

(1)

Current density: 0.5 A/cm$^2$

Fuel gas: H$_2$

Oxidant gas: air

Amount of cooling water: 10 cc*min$^{-2}$*cell

Fuel utilization: 99%

Oxidant utilization: 30%

(2)

Current density: 0.5 A/cm$^2$

Fuel gas: H$_2$/N$_2$=36/64

Oxidant gas: air

Amount of cooling water: 10 cc*min$^{-2}$*cell

Fuel utilization: 70%

Oxidant utilization: 15%

Figure 29A:
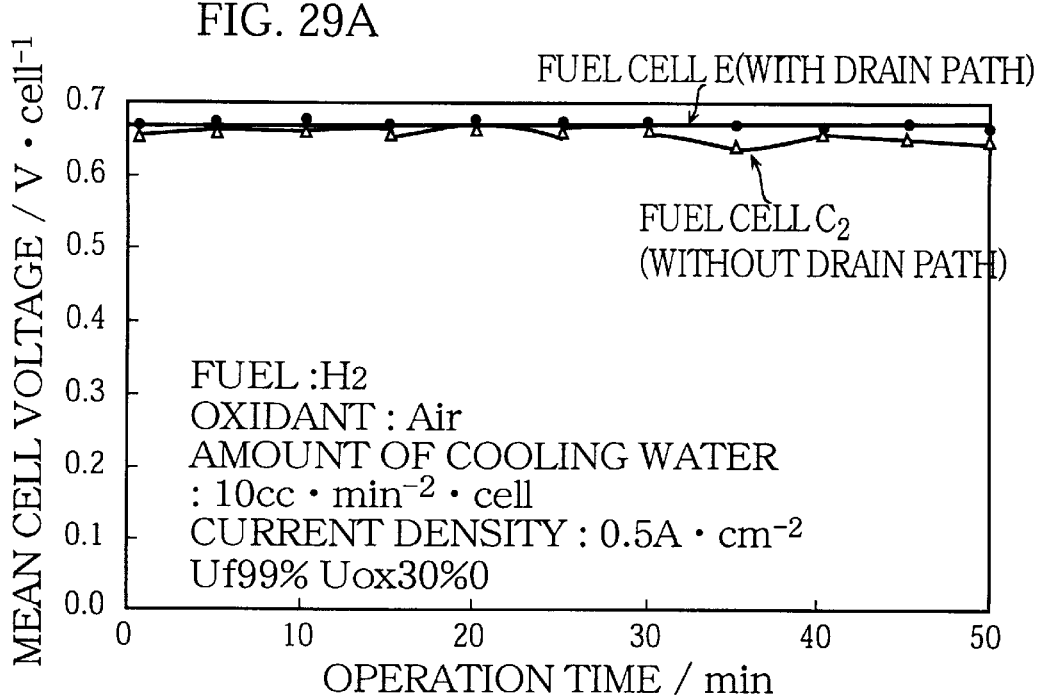
FIGS. 29A and 29B are plots of the measurement results of Experiment 8.
Figure 29B:
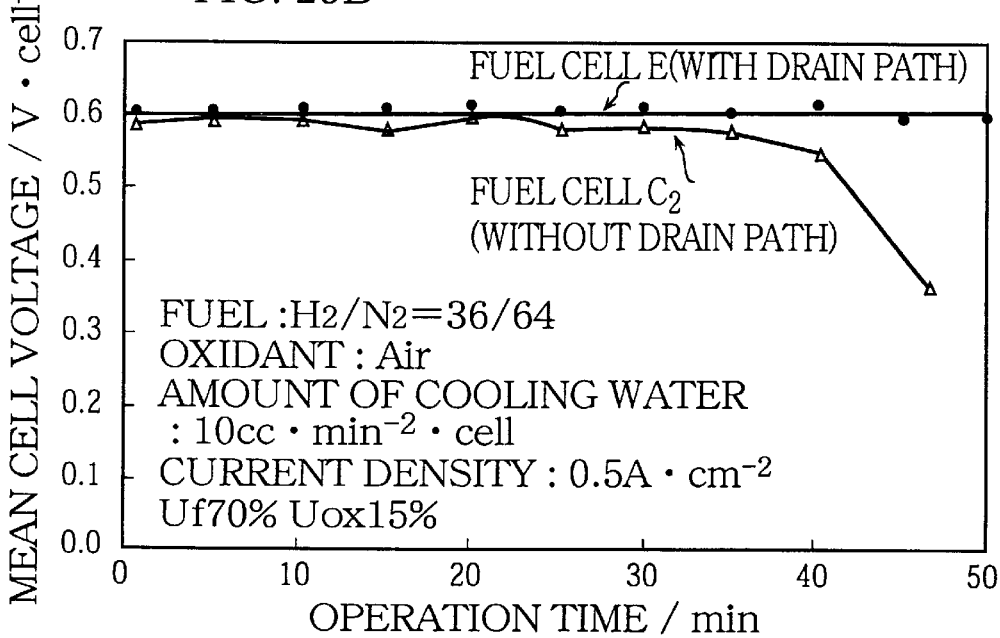

FIGS. 29A and 29B are plots of the results of this experiment. FIG. 29A is a plot of the results for condition (1) above. FIG. 29B is a plot of the results for condition (2).

It is understood from these plots that the cell voltage of the fuel cell C2 slightly decreases over time. It is understood from FIG. 29A that: in the fuel cell C2, the longer the period in which the fuel cell generates electric power is, the larger the decrease in the cell voltage is; while in the fuel cell E, the cell voltage remains almost the same over time.

The above results are interpreted as follows. In the fuel cell C2 in which the drain path is not formed, the amount of water blocked in the gas-exhausting manifold increases over time. This slightly interrupts fuel gas flow, resulting in reduction of the cell voltage. Especially, when a small amount of hydrogen is contained in the fuel gas, as in the condition (2), the decrease of the cell voltage is greatly affected. On the contrary, water is not blocked in the gas-exhausting manifold of the fuel cell E since the drain path is formed in the fuel cell.

INDUSTRIAL APPLICABILITY

The present invention provides a polymer electrolyte fuel cell in which fuel gas and water are supplied to anode-side channels to generate electric power. The polymer electrolyte fuel cell prevents the fuel gas from being blocked in the channels and supplies the fuel gas to the anode in entirety, resulting in stable generation of electric power over time.

Also, the polymer electrolyte fuel cell of the present invention enables the polymer electrolyte membrane to be moistened in entirety and enables the fuel gas to be effectively supplied to the anode in entirety, resulting in further improvement in electric power generation of the fuel cell and the cell life.

What is claimed is:

1. A polymer electrolyte fuel cell comprising a cell, a first plate, and a second plate, wherein the cell includes a polymer electrolyte membrane, a cathode, and an anode and is sandwiched by: the first plate with anode-side channels formed on a surface of the first plate facing the anode; and the second plate with cathode-side channels formed on a surface of the second plate facing the cathode, the polymer electrolyte fuel cell generating electric power when the anode-side channels are supplied with a fuel gas and air and the cathode-side channels are supplied with an oxidant gas, wherein the first plate includes a downstream part which is an extension of the anode-side channels located across an edge of the anode and downstream of flow of the fuel gas, and a gas-selectively-exhausting means for selectively exhausting gas is formed in a slot which is formed upstream of an end of the downstream part, the slot overlaying the downstream part.

2. The polymer electrolyte fuel cell of claim 1, wherein the gas-selectively-exhausting means is made of a selective permeation material which selectively passes gas.

3. The polymer electrolyte fuel cell of claim 2, wherein the selective permeation material is selected from the group consisting of: water-repellent carbon paper; porous membrane made of ethylene tetrafluoride resin; porous membrane made of ethylene tetrafluoride resin supported by polyester, polyolefin, polytetrafluoroethylene, tetrafluoroethyleneperfluoroalkyl vinyl ether copolymer, glass, and polypropylene; and polyester fiber coated with polyurethane.

4. The polymer electrolyte fuel cell of claim 1, wherein the gas-selectively-exhausting means has a slit construction.

5. The polymer electrolyte fuel cell of claim 1, wherein the first plate further includes a sucking means for sucking, holding, and discharging water, the sucking means being located downstream of the downstream part.

6. The polymer electrolyte fuel cell of claim 5, wherein the sucking means is achieved by weave, nonwoven, or felt whose major component is selected from the group consisting of: polyester; rayon; nylon; polyester/rayon; polyester/acrylic; and rayon/polychlal.

7. The polymer electrolyte fuel cell of claim 1, wherein
the first plate includes the anode-side channels on a surface thereof facing the anode, and
contact angle of water to inside of the anode-side channels is smaller than contact angle of water to a surface of the anode.

8. The polymer electrolyte fuel cell of claim 7, wherein the contact angle of water to an inside of the downstream part is equal to or smaller than the contact angle of water to the surface of the anode.

9. The polymer electrolyte fuel cell of claim 1, wherein
the first plate includes the anode-side channels on a surface thereof facing the anode, and
small grooves are formed on an inner surface of the anode-side channels.

10. The polymer electrolyte fuel cell of claim 9, wherein a mean width of the small grooves ranges from 5 $\mu$m to 200 $\mu$m.

11. The polymer electrolyte fuel cell of claim 9, wherein the small grooves are formed along flow direction in the anode-side channels.

12. The polymer electrolyte fuel cell of claim 11, wherein at least one small groove is formed for each of the anode-side channels.

13. The polymer electrolyte fuel cell of claim 1 further comprising:
a gas exhausting path for guiding the gas exhausted from the downstream part by the gas-selectively-exhausting means to outside the polymer electrolytefuel cell; and
a water discharging path for guiding the water discharged from the downstream part to outside the polymer electrolyte fuel cell, wherein
a drain path for guiding water is formed between the gas exhausting path and the water discharging path.

14. The polymer electrolyte fuel cell of claim 13, wherein the drain path includes:
a connection slot connecting the gas exhausting path to the water discharging path; and
a spongy material fitted in the connection slot.

15. The polymer electrolyte fuel cell of claim 14, wherein
the polymer electrolyte fuel cell is a stack of cell units each of which includes the cell, the first plate, and the second plate supported by a frame,
each of the gas exhausting path and the water discharging path is achieved by a manifold opened in the frame of each cell unit, and
the connection slot is formed on the frame of each cell unit.

16. The polymer electrolyte fuel cell of claim 1 further comprising:
a fuel gas distribution means for distributing a fuel gas to an inlet of each anode-side channel; and
a water distribution means for distributing water from a water supply source to an inlet of each anode-side channel through holes which connect a water path space to the inlet of each anode-side channel.

17. The polymer electrolyte fuel cell of claim 16, wherein
the first plate includes the anode-side channels on a surface thereof, and
the water distribution means distributes water to a plurality of channels among the anode-side channels.

18. The polymer electrolyte fuel cell of claim 17, wherein
the channels comprising the plurality of channels are positioned at intervals of one or two anode-side channels.

19. The polymer electrolyte fuel cell of claim 16, wherein
the holes with predetermined shapes are in a range of 120 $\mu$m to 5 mm in length and are in a range of 20 $\mu$m to 3 mm in diameter.

20. The polymer electrolyte fuel cell of claim 1, wherein
a water holding layer made of a hydrophilic material is formed inside each of the anode-side channels.

21. A polymer electrolyte fuel cell comprising a cell, a first plate, and a second plate, wherein the cell includes a polymer electrolyte membrane, a cathode, and an anode and is sandwiched by: the first plate with anode-side channels formed on a surface of the first plate facing the anode; and the second plate with cathode-side channels formed on a surface of the second plate facing the cathode, the polymer electrolyte fuel cell generating electric power when the anode-side channels are supplied with a fuel gas and air and the cathode-side channels are supplied with an oxidant gas, wherein
the polymer electrolyte fuel cell further comprises:
a fuel gas distribution means for distributing a fuel gas to an inlet of each anode-side channel; and
a water distribution means for distributing water from a water supply source to an inlet of each anode-side channel, wherein
the water distribution means includes a water path space which is adjacent to the inlet of each anode-side channel with a water distribution plate in between, and the water distribution means distributes water through the water path space and holes which are opened in the water distribution plate.

22. The polymer electrolyte fuel cell of claim 21, wherein
surface of the water distribution plate is formed so that, around the holes, contact angle of water to the surface is larger at a side of the inlet of each anode-side channel than at a side of the water path space.

23. The polymer electrolyte fuel cell of claim 21, wherein
the holes range from 120 $\mu$m to 5 mm in length and have a pore size ranging from 20 $\mu$m to 3 mm.

24. The polymer electrolyte fuel cell of claim 21, wherein
the first plate includes the anode-side channels on a surface thereof, and
the water distribution means distributes water to a plurality of channels among the anode-side channels.

25. The polymer electrolyte fuel cell of claim 24, wherein
the channels comprising the plurality of channels are positioned at intervals of one or two anode-side channels.

26. The polymer electrolyte fuel cell of claim 21, wherein
a water holding layer made of a hydrophilic material is formed inside each of the anode-side channels.

27. The polymer electrolyte fuel cell of claim 21, wherein
a valve for adjusting gas flow rate is disposed on a path of the gas exhausted by the gas-selectively-exhausting means so that fuel utilization is kept to be 90% or more.

* * * * *